(12) United States Patent
Jeffery et al.

(10) Patent No.: US 9,022,870 B2
(45) Date of Patent: May 5, 2015

(54) WEB-BASED GAME PLATFORM WITH MOBILE DEVICE MOTION SENSOR INPUT

(71) Applicant: Ai Golf, LLC, Mesa, AZ (US)

(72) Inventors: Mark John Jeffery, Mesa, AZ (US); Robert Sunshin Komorous-King, Berkeley, CA (US); Manoj Rana, Naperville, IL (US)

(73) Assignee: Aquimo, LLC, Mesa, AZ (US)

(*) Notice: Subject to any disclaimer, the term of this patent is extended or adjusted under 35 U.S.C. 154(b) by 134 days.

(21) Appl. No.: 13/875,179

(22) Filed: May 1, 2013

(65) Prior Publication Data

US 2013/0296048 A1    Nov. 7, 2013

Related U.S. Application Data

(60) Provisional application No. 61/641,825, filed on May 2, 2012.

(51) Int. Cl.
    *A63F 9/24*       (2006.01)
    *A63F 13/30*     (2014.01)

(52) U.S. Cl.
    CPC ........... *A63F 13/12* (2013.01); *A63F 2300/105* (2013.01); *A63F 2300/204* (2013.01); *A63F 2300/406* (2013.01); *A63F 2300/407* (2013.01)

(58) Field of Classification Search
    USPC ........................................ 463/42, 7; 473/131
    See application file for complete search history.

(56) References Cited

U.S. PATENT DOCUMENTS

| | | | |
|---|---|---|---|
| 6,545,661 B1 * | 4/2003 | Goschy et al. | 345/158 |
| 7,789,742 B1 | 9/2010 | Murdock et al. | |
| 7,796,548 B2 | 9/2010 | Lee | |
| 7,806,777 B2 | 10/2010 | Cheng | |
| 7,927,216 B2 | 4/2011 | Ikeda et al. | |
| 7,942,745 B2 | 5/2011 | Ikeda et al. | |
| 8,019,867 B1 | 9/2011 | Allen et al. | |
| 8,019,878 B1 | 9/2011 | Allen et al. | |
| 8,024,469 B1 | 9/2011 | Allen et al. | |
| 8,029,359 B2 | 10/2011 | Cheng | |
| 8,166,181 B2 | 4/2012 | Allen et al. | |
| 8,171,145 B2 | 5/2012 | Allen et al. | |
| 2002/0019763 A1 | 2/2002 | Linden et al. | |

(Continued)

FOREIGN PATENT DOCUMENTS

| EP | 1810724 A1 | 7/2007 |
|---|---|---|
| JP | 2004113689 A | 4/2000 |

(Continued)

OTHER PUBLICATIONS

Press Release, "iPING brings 'Fit for Stroke' update to app for iPhone 4 & iPod touch", 2 pages, Aug. 16, 2011.

(Continued)

*Primary Examiner* — Omkar Deodhar
(74) *Attorney, Agent, or Firm* — Morgan Law Offices, PLC

(57) ABSTRACT

A distributed gaming platform is provided wherein mobile devices (e.g., a smartphone) with motion sensors are used as input controllers of a game. A cloud-based gaming rules engine manages multiple players and the content for display in the game. The game output is displayed on any web-enabled display which is physically distinct from the mobile device. Multiple players may simultaneously play the same game, or different games, in multiple geographic locations.

48 Claims, 13 Drawing Sheets

(56) References Cited

U.S. PATENT DOCUMENTS

| | | |
|---|---|---|
| 2005/0054457 A1 | 3/2005 | Eyestone et al. |
| 2005/0113183 A1 | 5/2005 | Noble |
| 2006/0063980 A1 | 3/2006 | Hwang et al. |
| 2006/0117356 A1 | 6/2006 | Jojic et al. |
| 2007/0053446 A1 | 3/2007 | Spilo |
| 2008/0291220 A1 | 11/2008 | Cheng et al. |
| 2008/0319787 A1 | 12/2008 | Stivoric et al. |
| 2009/0183010 A1 | 7/2009 | Schnell et al. |
| 2010/0281107 A1 | 11/2010 | Fallows et al. |
| 2010/0304804 A1 | 12/2010 | Spivack |
| 2011/0190061 A1 | 8/2011 | Takeda et al. |
| 2011/0195780 A1* | 8/2011 | Lu .................................. 463/31 |
| 2012/0034980 A1* | 2/2012 | Weston et al. ................. 463/39 |
| 2012/0052933 A1 | 3/2012 | Olson et al. |
| 2012/0077586 A1 | 3/2012 | Pishevar |

FOREIGN PATENT DOCUMENTS

| | | |
|---|---|---|
| JP | 2010011926 A2 | 1/2010 |
| KP | 2001003645 B1 | 1/2010 |
| KR | 101059258 B1 | 8/2011 |
| WO | 2004056425 A2 | 7/2004 |
| WO | 2005113079 A2 | 12/2005 |
| WO | 2008052605 A1 | 5/2008 |
| WO | 2011085494 A2 | 7/2011 |

OTHER PUBLICATIONS

Press Release, "PING introduces iPhone and iPod putter fitting application", 1 page, Jul. 19, 2011.

Press Release, "PING's new iPING putter app targets consistency for improved putting", 2 pages, Jun. 14, 2011.

Tech Tips and Toys, New iPing Putter App—For iPhone, Jun. 19, 2011 (Retrieved on http://techtipsandtoys.wordpress.com/2011/06/19/new-iping-putter-app-for-iphone.

Arrington. SGN's iFun Turn iPhone Into PC Game Controller. 2008. [retrieved on Aug. 13, 2013]. Retrieved from the Internet:<URL: http://techcrunch.com/2008/11/17/sgns-ifun-turns-iphone-into-pc-game-controller/>entire document.

Wilmot. ASRock AIWI turns your iPhone into motion controller, we go hands-on. 2010. [retrieved on Aug. 13, 2013]. Retrieved from the Internet:<URL: http://www.tweaktown.com/news/15420/asrock__aiwi__turns__your__iphone__into__motion__controller__we__go__hands__on/index.html> entire document.

International Search Report and Written Opinion (PCT/US13/39219) date of mailing Aug. 23, 2013.

* cited by examiner

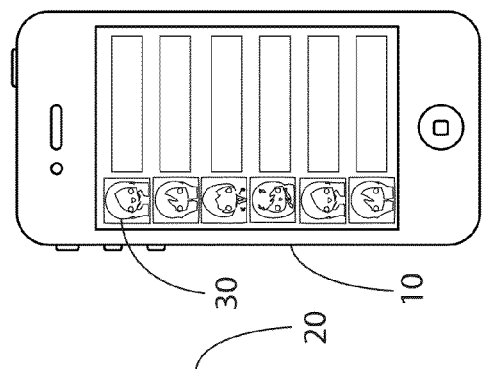
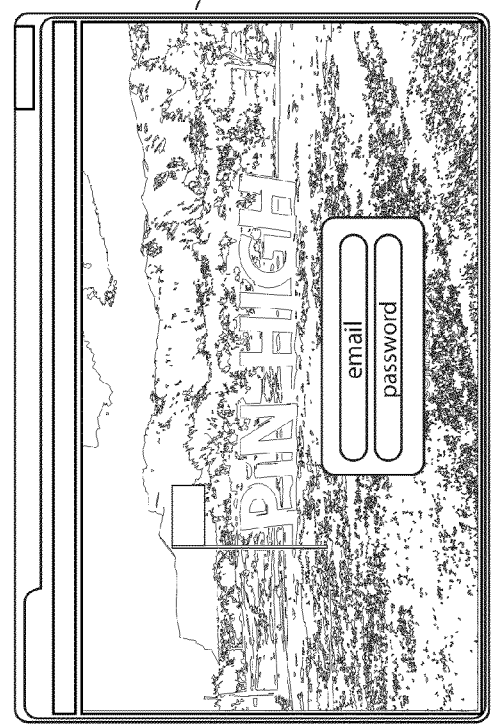
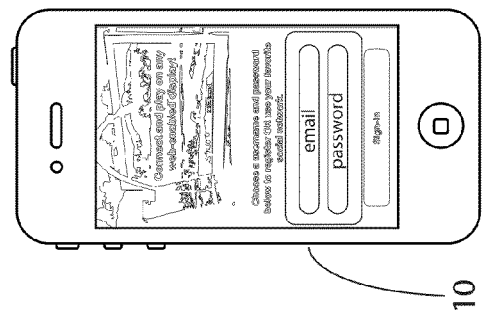
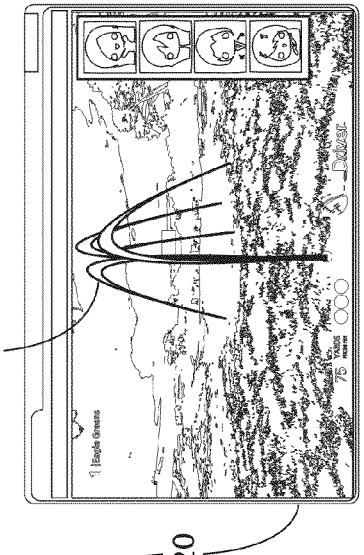
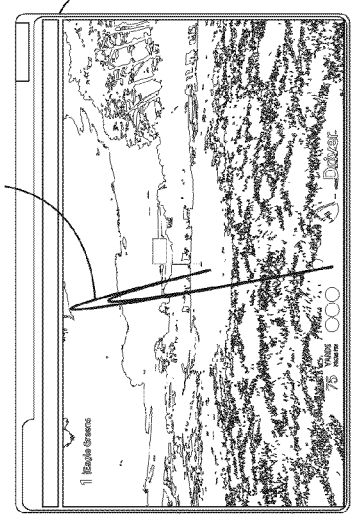
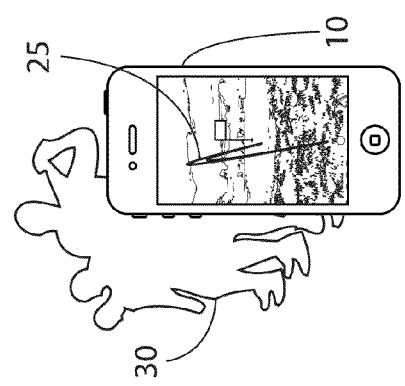
FIG. 4(b)
FIG. 4(a)
FIG. 4(c)
FIG. 4(e)
FIG. 4(d)

WEB-BASED GAME PLATFORM WITH MOBILE DEVICE MOTION SENSOR INPUT

CROSS-REFERENCE TO RELATED APPLICATIONS

This application claims the benefit of U.S. Provisional Ser. No. 61/641,825 to Jeffery et al., entitled WEB-BASED SPORTS GAME PLATFORM WITH MOBILE PHONE MOTION SENSOR INPUT, filed May 2, 2012, the subject matter of which is incorporated herein by reference. This application is also related to U.S. patent application Ser. No. 13/269,534 to Jeffery, filed Oct. 7, 2011, and entitled "METHOD AND SYSTEM FOR DYNAMIC ASSEMBLY OF MULTIMEDIA PRESENTATION THREADS"; U.S. application Ser. No. 13/655,366 to Jeffery et al., entitled METHOD AND SYSTEM TO ANALYZE SPORTS MOTIONS USING MOTION SENSORS OF A MOBILE DEVICE, filed Oct. 18, 2012; and U.S. application Ser. No. 13/659,774 to Jeffery et al., entitled METHOD TO PROVIDE DYNAMIC CUSTOMIZED SPORTS INSTRUCTION RESPONSIVE TO MOTION OF A MOBILE DEVICE, filed Oct. 24, 2012; the subject matter of each incorporated by reference herein in its entirety.

BACKGROUND OF THE INVENTION

1. Field of the Invention

The present invention relates to the field of computer games, and more particularly, to a distributed web-based game platform with mobile device motion sensor input.

2. Description of the Related Art

There is extensive prior art in video gaming, dating back to the first game of Pong in 1972, where with a very simple controller users hit a "ball" (a dot on the screen) back and forth with "paddles" (two short lines sliding up and down) on a monochrome screen. Controllers and gaming consoles have advanced considerably in the last 40 years. The PlayStation Move, for example, has customized controllers for golf (Tiger Woods Golf) and tennis (Grand Slam Tennis), or fighting (The Fight), where the gaming console costs approximately $250 and customized controllers an additional $70. The Move controller, for example, uses a camera and captures motion via a Bluetooth controller with infrared light sensors. The Xbox 360 Kinect does not even use a physical controller, as player body motions are captured via three, 3-D cameras and sophisticated pattern recognition algorithms. The Wii, PlayStation, and Xbox 360 have network capability so as to enable multiplayer gaming through their hosted online networks.

Many personal-computer-based games use a keyboard and/or mouse of a computer as the controller. In World of Warcraft, for example, by using the keyboard for communication, users click their character and on-screen functions to control the motions of soldiers as they move, battle, and build. In Gameloft Let's Golf 3 and World PGA Tour Golf, players click a "sliding bar" to control the swing of an avatar golf character. Although these games dispense with the need to purchase costly controllers, they can be difficult to control using a keyboard and/or a mouse. This is particularly apparent in high-skill games such as golf where an optimal swing to hit the ball requires a multidimensional body motion combining an arm swing, hip and shoulder turn, wrist hinge, hip shift, forearm rotation and inside out swing path, each of which done incorrectly results in a less than optimal shot. Indeed, it is simply not possible to simulate the full dynamics of a golf swing using a keyboard and/or a mouse.

The Nintendo Wii controller is connected via a Bluetooth connection to the gaming console and senses acceleration in three axes using an ADXL330 accelerometer. The Wii remote also features a PixArt optical sensor, which in combination with a 10 LED Sensor Bar, physically connected to the game console, allows the determination of where the Wii Remote is pointing. A Taiwanese company, ASRock, claims to use iPhone motion sensors to mimic the controller for a Nintendo Wii game, so that users can play existing Wii or PC-based games using an iPhone as a game controller. The iPhone is connected using Bluetooth or a WiFi network to the gaming console. This reduces the cost of the controller, but users still need the game console or a specific game controller hardware motherboard in their personal computer. ASRock software installation is also challenging and there are some usability issues.

Note that the Nintendo Wii controller, or simulated ASRock Wii controller using an iPhone, provides data that is not an accurate representation of many sport motions, such as a golf swing, a baseball swing or a tennis serve. That is, the Wii controller can provide only gross approximations to many sports motions. For example, it can sense if you made a golf swinging motion, and approximately how hard you swung, but the method cannot accurately calculate the speed at impact or the precise angle of the club head through impact.

US Published Patent Application 2010/0069158 to Kim discloses a method for multi-player card and board games such as Korean Hwatu and Mah-Jong with mobile phones, a gaming server, and a gaming console connected to a display device. However, Kim explicitly requires a gaming console physically wired to the display device, has simple key data input (ASCII data) from the mobile devices not suitable for use for realistic control of sports games, such as golf, and the mobile phones must be connected to the gaming console (e.g., via Bluetooth, infrared or a wireless LAN connection).

U.S. Pat. No. 8,019,878 to Allen et al. describes a method to control a web browser on a local area network (LAN) with a mobile device in order to create a game. However, the method is limited to devices connected on the same LAN and requires direct connection of the mobile device with the web browser on the LAN and a plug-in software download to the web browser, which does not work in currently available web-enabled TVs.

There are significant limitations in the video gaming prior art. In the case of the console-based games, the total cost of ownership to the user is significant (at least $250 for the platform to support a single game, with individual games costing about $70 each and controllers costing an additional $70). Perhaps this is one reason that sales for console-based games have been stagnant for several years. For PC-, tablet- or mobile phone-based games, typical user input is via a computer keyboard or touch screen, and this interface is not optimal for gaming involving sports body motions, such as golf, baseball, bowling or tennis.

SUMMARY OF THE INVENTION

According to the systems and methods of the present invention, a distributed gaming platform is provided wherein mobile devices with motion sensors are used as input controllers of a game. A cloud-based gaming server managers multiple players and the content for display in the game. The game output is displayed on any web-enabled display which is physically distinct from the mobile device. Multiple players may simultaneously play the same game, or different games, in multiple geographic locations.

A notable feature of the present invention is that each user establishes two separate, simultaneous Internet connections: one from the user's mobile device to a cloud-based gaming rules engine, and the other from the web-enabled display to the gaming rules engine. While not required, there may also be a connection from the mobile device directly to the display device, if the mobile device and the display device are on the same wireless local area network (LAN). This optional connection has the advantage of reducing latency to the user and display device. That is, where the display device is on the same local area network (LAN) with the mobile device, directly passing of swing data to the display device via the LAN is faster than sending the data out via multiple routers to a remote server and then back via multiple routers to the display device.

Furthermore, a distributed architecture is employed with three levels of computation processing: body motions are analyzed using the processor of the mobile device, the cloud based gaming rules engine manages multiple players, analyzes player interactions, stores and analyzes player motion histories, and pushes (or allows pulling of) gaming content to each display device, and the display device itself processes local gaming logic and renders animations using a lightweight gaming logic pushed from the cloud-based gaming rules engine.

There are at least three significant advantages of the present approach:

No additional equipment is necessary. By 2015, there will be over one billion smartphones worldwide, and all these new phones will have motion sensors. The system disclosed herein is significantly less costly than a conventional gaming console, and in the near future, the average user will have all the necessary equipment: a mobile device with motion sensors and a web-enabled display.

A computer keyboard, mouse, or touch screen is not needed to control the game. The keyboard approach is particularly unrealistic for sports motion games such as golf, baseball or tennis. For golf, tennis or baseball, for example, there is a significantly more real world experience swinging a phone to hit a virtual ball displayed on a Web enabled TV, instead of hitting a key on a keyboard or clicking a mouse. Furthermore, Wii game controllers and video based body motion capture are not particularly accurate, and do not currently enable precise analysis of a golf swing, for example, just gross movement.

Gaming consoles, such as a Wii or Xbox, enable rich graphic rendering of three-dimensional objects and have the equivalent computing power of a high-performance supercomputer, such as a Cray Y-MP, of the 1990's. The disclosed system enables multiplayer simultaneous gaming in multiple geographically disperse locations without purchasing a gaming console or personal computer with a high performance graphics processor. The disclosed games are specifically designed to work on any web-enabled device, with relatively low computing power, and have rich graphics content that is actually an enhancement to some console games, such as Tiger Woods PGA Golf.

Furthermore, to implement the disclosed web-based distributed gaming platform at least five significant technical innovations are utilized:

(1) a method for accurately capturing raw motion data from mobile device sensors, analyzing these data on the mobile device, and transmitting the analyzed data in a form that enables a low latency connection;

(2) a method to systematically reduce the bandwidth and latency of the gaming display media, sent from the gaming rules engine to the web enabled display device, and for queuing content for caching at the web-enabled display so as to minimize bandwidth utilization and latency;

(3) a method to enhance the gaming display media for specific display devices so as to simulate the real world, while optimizing for the bandwidth and resolution of the display device;

(4) a method for the distribution of computations such that the mobile device, gaming rules engine, and web-enabled display optimally analyze gaming motions, multi-players, gaming rules, and respective output display animations in a distributed processing architecture; and (5) a method for the gaming rules engine and display device to detect user inputs that can use either periodic polling of a user database or an event-driven architecture, wherein the mobile devices publish swing events, and the gaming engine and display device subscribes to specific events for specific users.

These and other aspects, features, and advantages of the present invention will become apparent from the following detailed description of preferred embodiments, which is to be read in connection with the accompanying drawings.

BRIEF DESCRIPTION OF THE DRAWINGS

FIGS. 4(a) to (e) illustrate various user experiences in a preferred embodiment of a golf game of the present invention;

DETAILED DESCRIPTION OF THE INVENTION

As used herein, a mobile device refers to a hand-held device having a microprocessor, memory, and integrated motion sensors. Examples of such mobile devices include the Apple iPhone, Apple iPod and Samsung Galaxy smartphone.

It is to be understood that such mobile devices mentioned herein are meant for illustrative purposes only.

As used herein, a display device refers any Internet connected display capable of graphically displaying a Web page.

As used herein, an image refers to any visually perceptible graphical element including, but not limited to, a photograph, a sprite, a cinemagraph, a video, a raster or vector image, an animation, and other graphics-engine generated visual objects, and combinations thereof.

As used herein, bandwidth utilization refers to the amount of data that can be passed along a communications channel in a given period of time.

As used herein, latency refers to the time delay between transmission and receipt of data.

As used herein, calibration point refers to the location in time and space of the mobile device in a set-up position prior to the start of a sports motion.

As used herein, impact point refers to the location in time and space of impact with a virtual object.

As used herein, release point refers to the location in time and space of the release of a virtual object.

In some sports, such as golf, the impact point and release point may be the same physical location in time and space. However, in other sports the impact point and release point may not coincide. For example, in lacrosse the ball is caught by a long-handled stick (the ball impacts the lacrosse stick at the impact point) and then is later thrown from the stick from a different location (at the release point). Furthermore, in some sports there is only a release point since there is not a point of impact. For example, in fly fishing the release point occurs by a flick of the wrist imparting angular momentum to the fishing rod, which above a certain maximum value causes the weighted fishhook to release from the rod.

Figure 1:
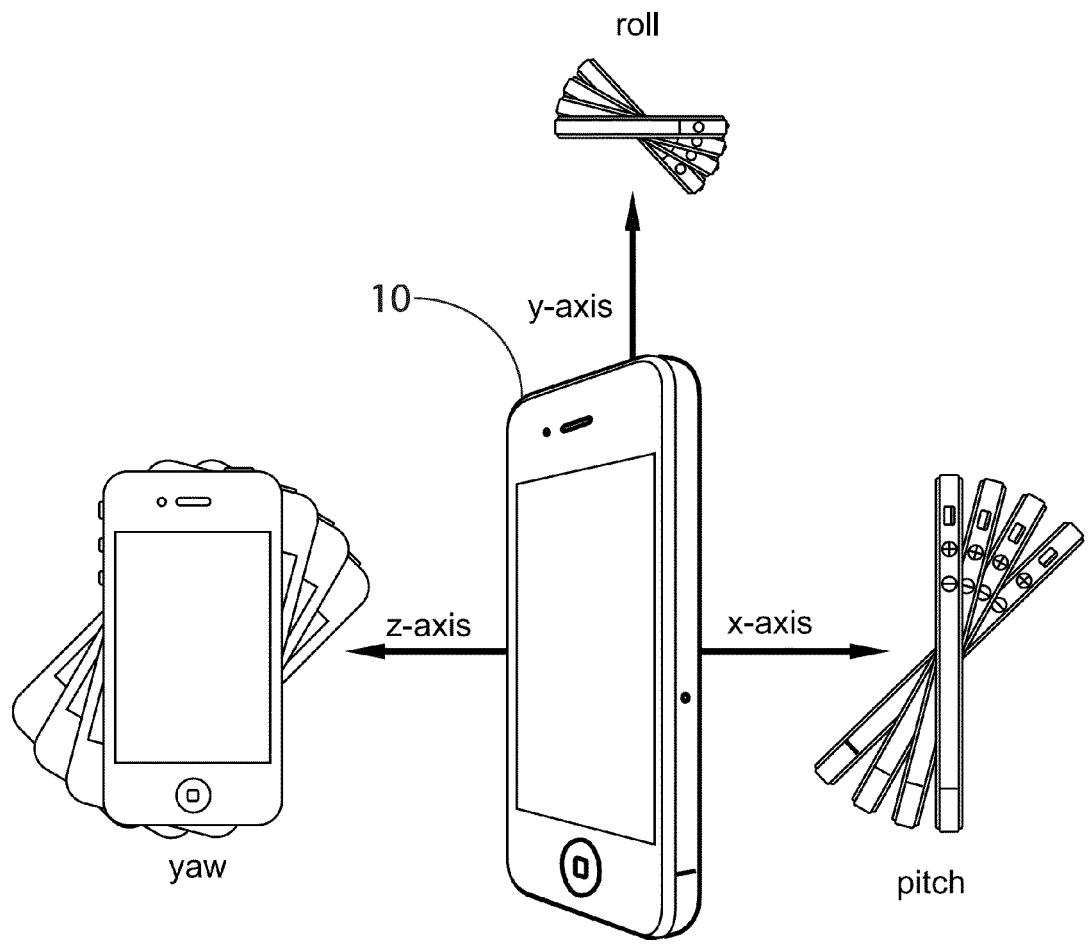
FIG. 1 illustrates various types of rotational movement of a mobile device.

FIG. 1 illustrates various types of rotational movement measured by the motion sensors of a mobile device 10. These sensors include an accelerometer to capture X, Y and Z acceleration data (expressed in G's along a respective axis), and a gyroscope to measure pitch, roll and yaw of the mobile device 10 as it moves (expressed in radians with respect to a respective axis). At present, the motion sensors sample at about 100 times per second (100 hertz), with this data made available (by either polling or having the data pushed) to an application loaded on the mobile device 10. A representative gyroscope useable in conjunction with the present invention is the L3G4200D gyroscope made by STMicroelectronics, Inc. However, it is to be understood that the present invention is not limited to motion sensor technology currently available.

Figure 2:
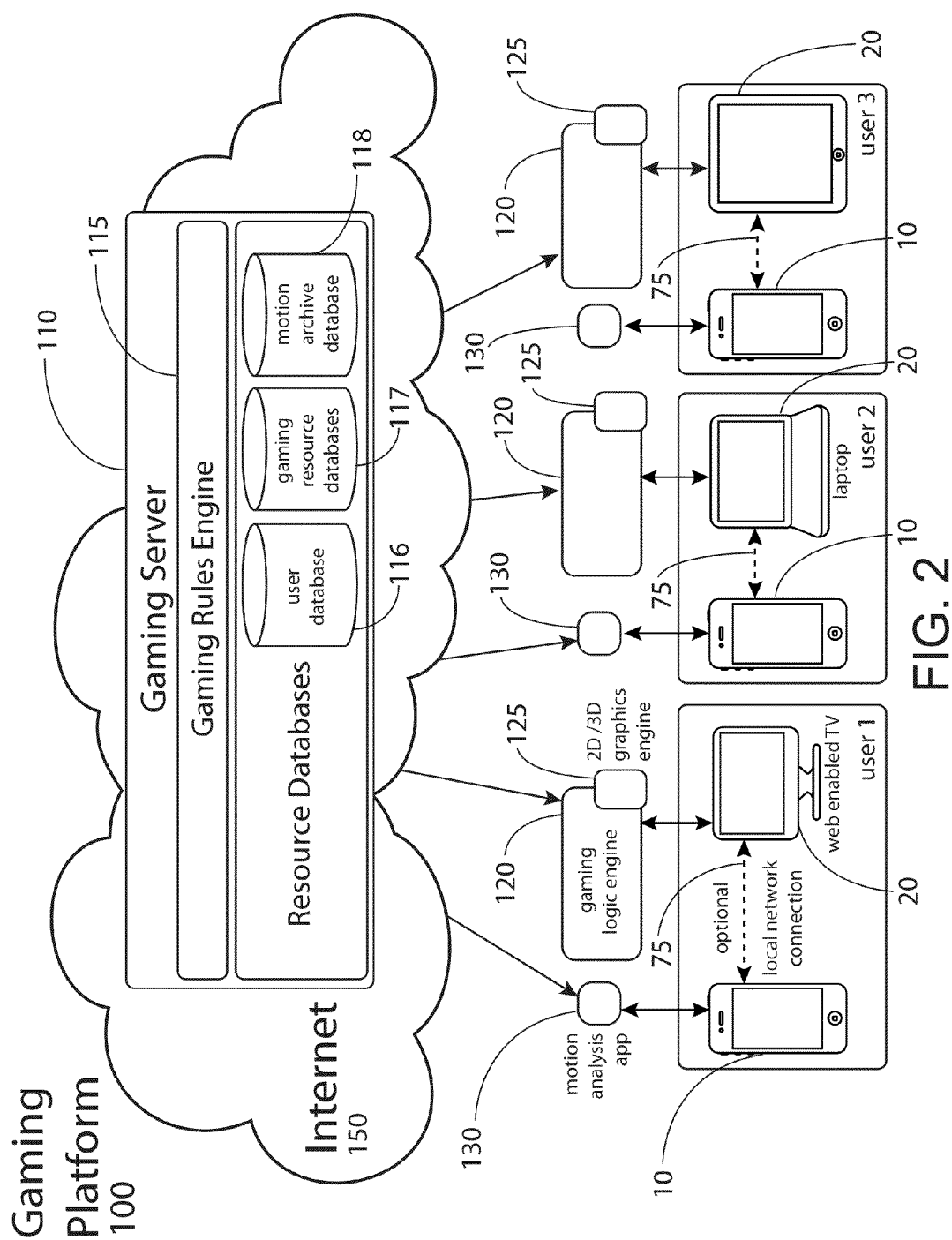
FIG. 2 illustrates an exemplary architecture for a multi-player distributed gaming platform, according to an embodiment of the present invention.

FIG. 2 illustrates an exemplary architecture of a gaming platform 100, according to an embodiment of the present invention. As shown, the three major components of the gaming platform 100 are the mobile devices 10, a gaming server 110, and display devices 20. The gaming server 110 includes a gaming rules engine 115 that manages a plurality of games being played. As shown, the gaming rules engine 115 has access to a user database 116, a gaming resources database 117, and a motion archive database 118. The user database 116 stores login information and game information. For golf, the game information can include swing data for each swing made during the game, the player's current score, current golf hole number, current selected golf club, etc. The gaming resources database 117 can include graphical content for simulating the game on the display device 20. For instance, for golf, the gaming resources database 117 can include a plurality of 2-D images or videos of portions of each the golf holes indexed such that images can be retrieved based on which segment of a golf hole the virtual golf ball is projected to land. As will be described in greater detail, the gaming resources database 117 can also include various other graphical elements (such as cinemagraphs, videos and sprites) to enhance the gaming experience. The motion archive database 118 includes historical motion data for long-term analysis, e.g., for golf, data on swing motion accuracy for longitudinal comparisons of swing, putting and chipping consistency improvement.

In the illustrated embodiment, the gaming server 110 is cloud-based enabling global connectivity via the Internet 150. For each user, the user's mobile device 10 and display device 20 can be simultaneously connected to the gaming server 110 through separate and distinct Internet connections. The mobile device 10 transmits data, including analyzed motion data to the gaming server 110; in turn, the gaming server 110, facilitates display of gaming media at the display 20 through a separate Internet connection. In an embodiment, a light weight gaming logic engine 120, in the form of a software application, can be pushed to a suitable Web-enabled display device 20 where a substantial amount of the logic of the gaming rules engine 115 is encoded, and the gaming logic engine 120 can then perform much of the work otherwise to be performed directly at the gaming server 110.

In an embodiment, a user's mobile device 10 and display device 20 can be optionally connected, depicted by the dashed line 75 in FIG. 2, via a local area network (LAN) on the same network. The LAN connection enables very low latency between motions and gaming animation displays for users in the same geographic location. In this embodiment, the motion data passes directly from the mobile device 10 to the display device 20 and to the gaming server 110 in order to enable multiplayer gaming in different geographic locations (not on the same physical LAN). Motion data is transmitted from each mobile device 10 to the gaming server 110 via the Internet 150, where it is used to update the display devices 10 and/or 20 of the other players in the game. The LAN connection 75 enables very fast (millisecond) passing of data to a display device 20 on the same LAN as the mobile device 10, speeding up the game play for that particular player. So, for example, swinging the mobile device 10 will result in the appearance of a nearly instantaneous ball flight on the display device 20 when both are connected on the same LAN, versus an appreciable (e.g., third of a second) delay for data transmitted to the gaming logic server and then forwarded to the display device 20 via a non-local connection.

Where the display device is a personal computer (PC), web-enabled TV, tablet, or similar computing device, a connection can be accomplished by installing a suitable web browser plug-in. Preferably, the user will be required to click a "consent button" to install the plug-in and enable searching the LAN for a mobile device 10 and communicate with the device 10. Alternately, the program could be a custom web browser configured to "listen" to the local network, so that the plug in is effectively built-in. Current iPad, Android, and Web TV web browsers do not support plug-in functionality; however it is anticipated that in the near future some of these devices will become more open platforms and enable similar connections. For the iPad and Android platforms, custom apps can be written that are essentially skins around a web browser with the plug-in incorporated. Hence, a direct LAN connection to a mobile device 10 can be made to a multitude of web enabled display device platforms.

Figure 3:
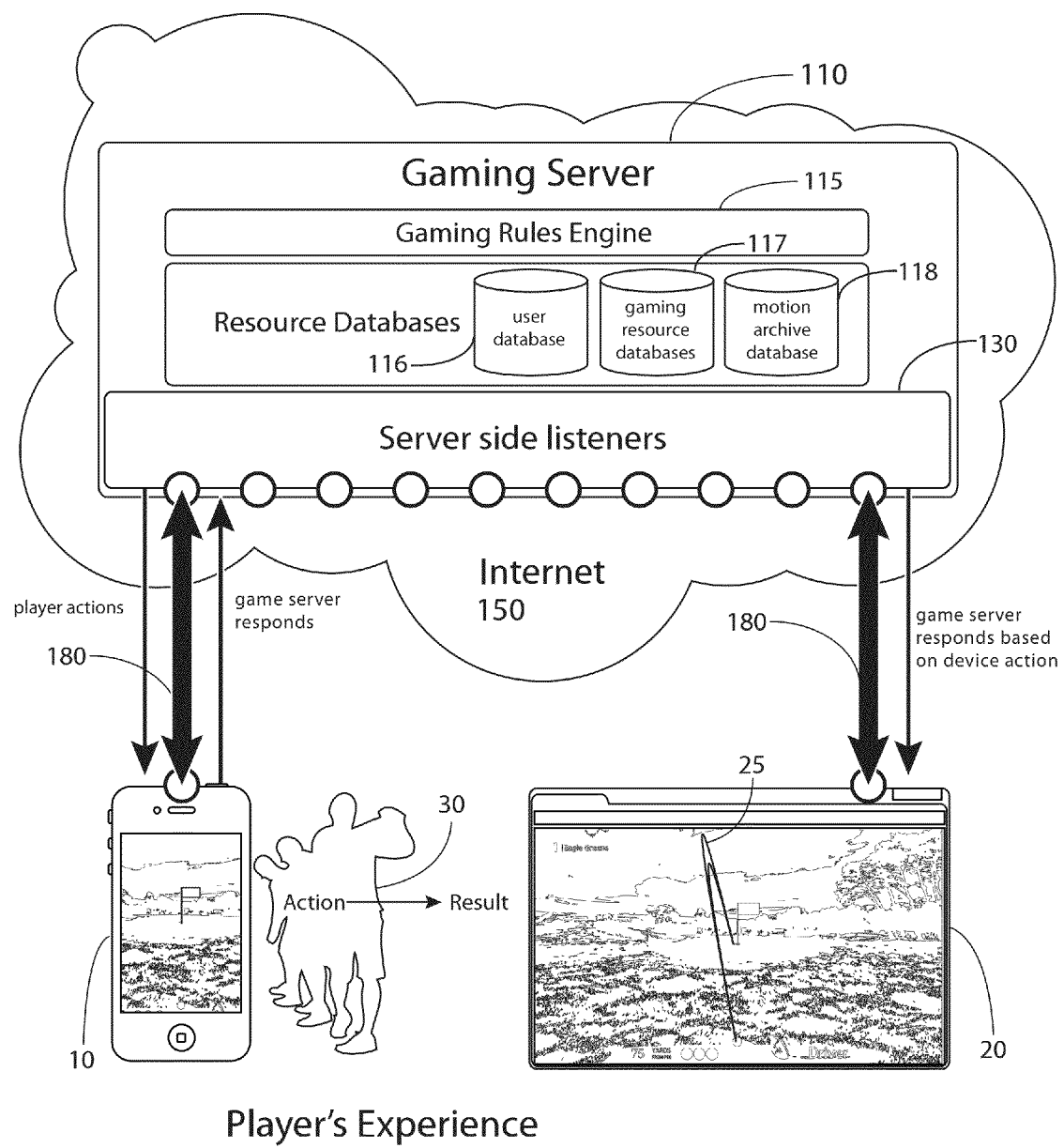
FIG. 3 illustrates an exemplary embodiment of the multi-player gaming platform architecture, according to an embodiment of the present invention.

FIG. 3 illustrates an exemplary embodiment of the multi-player gaming platform architecture, according to an embodiment of the present invention. The mobile device 10 and the web display device 20 can be in the same geographical location or in different locations. The communication between the mobile device 10 and the web display device 20 takes place via the use of long polling, such as a WebSocket. As shown, two different long polling connections 180 are established between the mobile device 10 and the gaming server 110, and the gaming server 110 and the display device 20. The gaming server 110 employs a plurality of polling ports 130 so as to support a plurality of users and display devices.

In the following description of the present invention, exemplary methods for performing various aspects of the present invention are disclosed. It is to be understood that the methods and systems of the present invention disclosed herein can be realized by executing computer program code written in a variety of suitable programming languages, such as C, C++, C#, Objective-C, Visual Basic, and Java. It is to be understood that in some embodiments, substantial portions of the application logic may be performed on the display device using, for example, the AJAX (Asynchronous JavaScript and XML) paradigm to create an asynchronous web application. Furthermore, it is to be understood that in some embodiments the software of the application can be distributed among a plurality of different servers (not shown).

It is also to be understood that the software of the invention will preferably further include various Web-based applications written in HTML, PHP, Javascript, XML and AJAX accessible by the clients using a suitable browser (e.g., Safari, Internet Explorer, Mozilla Firefox, Google Chrome, Opera).

A significant aspect of the present invention is a systematic approach to optimizing bandwidth utilization and minimizing latency, while rendering optimal graphics resolution for a specific display device 20. Latency is a particularly important issue of concern, and is related to bandwidth utilization and display graphics resolution. Time delays between user input body motions and simulated actions on the output display device detract from the realism of a sports game. Furthermore, delays loading the next scene can also frustrate users. Another goal is to enable as seamless a user experience as possible, with almost instantaneous display outputs in responses to input motions, with less than one second transitions from scene to scene of rich graphics content.

As an example of the impact of bandwidth utilization, a 5 MB (megabyte) video or photograph will take 40 seconds to download with a 1 Mb/s (T1) connection. The same video will take 8 seconds to download with a 5 Mb/sec connection, which is the average household broadband connection speed in the United States. Hence, if the data density (number of bits) for the game is large, then the user will experience potentially significant delays as the content is downloaded.

It is anticipated that in the next several years average bandwidth utilization will increase significantly in developed countries, to approximately 50 Mb/s. This is due to the invention of 4G and LTE cellular data networks, and fixed line cable and telecommunications operators upgrading their systems to remain competitive with 4G. At 50 Mb/s the 5 MB file will take only 0.8 seconds to download. However, simultaneously over time, display devices are increasing in size and pixel resolution. As examples, in 2012, the average LCD TV display device is 37" in the US with a 1920×1080 pixel resolution and costs $300-$500, where the same resolution 46" costs approximately $700 and the 60" displays cost less than $2000. By 2015 a 60" LCD may be near the $700 price point, but the resolution will increase to 2560×1440. Hence, there are dueling factors of bandwidth utilization and display resolution, both increasing in parallel over time.

As an example of latency, as the user swings the mobile device 10 (assuming the mobile device and display device are on different networks), there is a time delay as the data is transmitted across the Internet, to the gaming server 110 where computations are performed, then to the display device 20. This time delay is exacerbated if large bandwidth files are being transferred simultaneously to the display device, exceeding the bandwidth utilization of the device, since the motion data essentially must get into a queue waiting in line with the other gaming data being transferred through the bottleneck. The methods disclosed herein optimize the system performance on the three dimensions of (1) bandwidth utilization, (2) overall system latency, and (3) display device resolution.

In FIGS. 2 and 3, the overall system latency ΔT for sports motions detection and output display is:

$$\Delta T = \Delta t_{Swing\ Analysis} + \Delta t_{Network_{12}} + \Delta t_{Gaming\ Server} + \Delta t_{Network_{23}} + \Delta t_{Graphics\ Engine} \quad (1)$$

Where $\Delta t_{Swing\ Analysis}$ is the time for the sports motion analysis on the mobile device, $\Delta t_{Network_{12}}$ is the transmission time across the network from the mobile device 10 to the gaming server 110, $\Delta t_{Gaming\ Server}$ is the processing time at the gaming server 110, $\Delta t_{Network_{23}}$ is the transmission time from the gaming server 110 to the display device 20 and $\Delta t_{Graphics\ Engine}$ is the processing and time to display animations, images or other data on the display device 20. The advantage of long polling, such as WebSockets, in the embodiment of FIG. 3, is that the motion data from the mobile device 10 is broadcast to the gaming engine 110 as an event which in turn broadcasts to the display device 20. The latency is approximately 50 milliseconds (ms) between WebSocket connections in the continental United States. Using the architecture illustrated in FIG. 3 for small packets of data, such as motion data and user interface updates, the overall system latency is therefore primarily constrained by the motion analysis processing at the mobile device 10, the gaming engine processing, and the graphics engine display, not the data transmission time across the Internet which is approximately $\Delta t_{Network_{12}} + \Delta t_{Network_{23}} = 100$ msec.

In practice, the architecture of FIG. 3 provides a near real-time synchronization between the mobile device 10, gaming server 110 and web display 20 for multiple simultaneous users. This architecture allows near real time synchronization of user activities on a mobile device 10 and a web display device 20 while simultaneously enabling swing motion data transfer to and from the gaming server 110. Additionally, the architecture of FIG. 3 is highly scalable, and could be implemented to accommodate thousands of players playing simultaneously, without departing from the essential design. In that case, thousands of different games could be at various stages of completion at any given time, and the architecture could also support various different types of sports games, such as golf, baseball, bowling, etc., being managed by the gaming server 110, at any given time.

These and other novel elements of the invention will become apparent from the following detailed description of the invention in the context of a virtual multi-player golf game, two and four player tennis game and a multi-player baseball game. However, it is to be understood that the following examples are not meant to be limiting.

Golf Game Example

Figure 5:
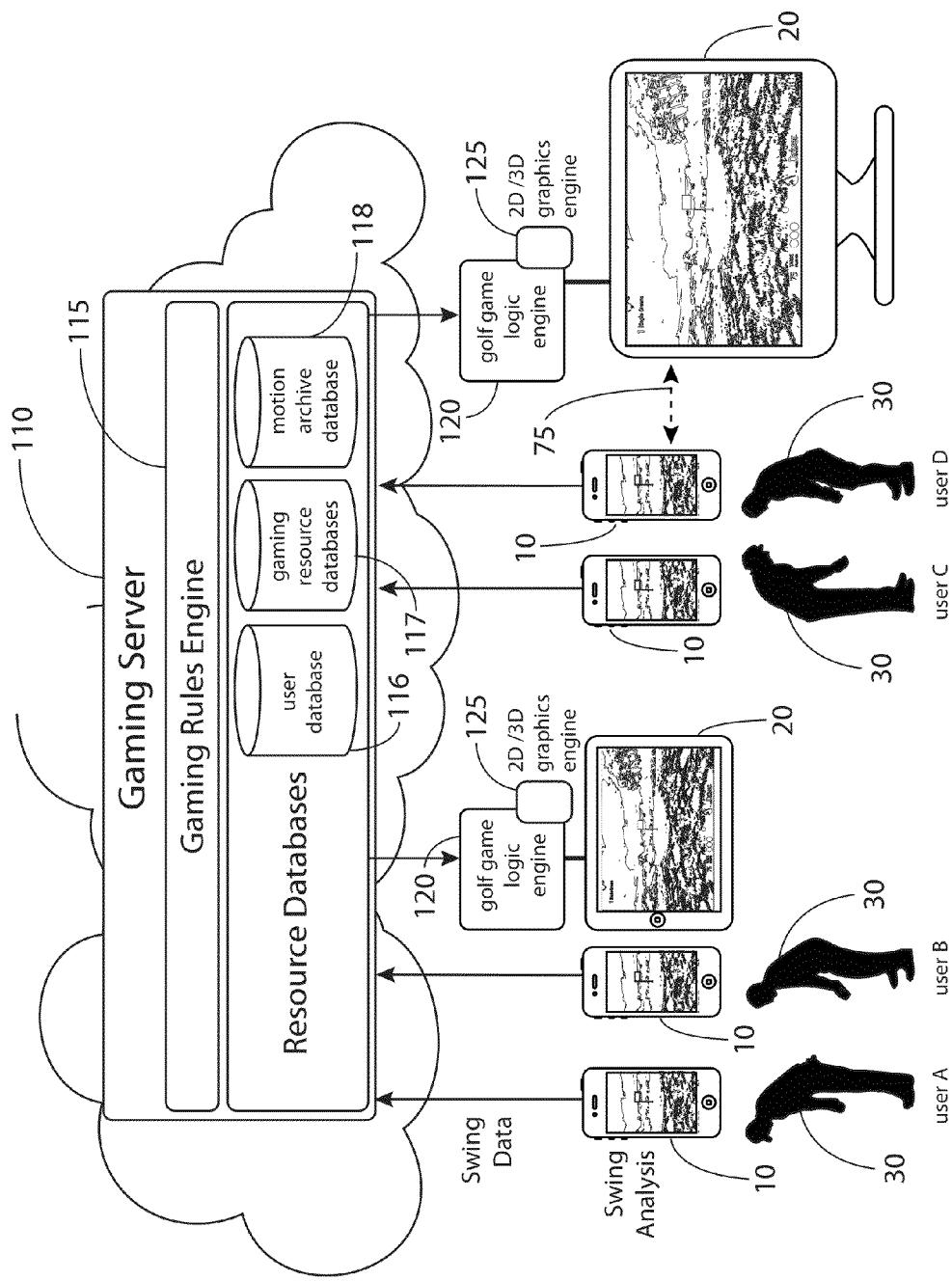
FIG. 5 illustrates an exemplary embodiment of the multi-player gaming platform for a golf game, according to an embodiment of the present invention.

Referring to FIGS. 4-10, the present invention will be further clarified by the following example of a golf game implemented using techniques described herein, according to an embodiment of the present invention. FIGS. 4(a) to 4(e) show the user experience and FIG. 5 is the corresponding distributed golf gaming architecture.

In an embodiment, to access the distributed gaming platform 100, a user first downloads an application ("app") to their mobile device 10. In an embodiment for the Apple iPhone 4/4s, the app is programmed in Objective C, and utilizes the CoreMotion framework included in the Cocoa Touch SDK (software development kit) to gain access to, at 100 samples per second, built-in hardware-based sensors such as an accelerometer, a gyroscope, and a magnetometer. A layer above this called a "signal-processing pipeline" includes a platform-independent class of programs to provide real-time swing analysis calculations. On top of the signal-processing pipeline layer rests a graphics-based gaming presentation layer, which processes data calculated by a signal processing engine, passes these data to the server based gaming rules engine, and presents the user with mobile device specific content to complement the gaming experience.

In an alternate embodiment, a mobile website can access the same hardware based sensors using simple Javascript event handlers in a mobile browser. Accessing these sensors through a browser is generally far slower than the CoreMotion framework, however, with 10 samples per second sampling with present technology. Here we use the same signal processing pipeline to analyze swing data, and an interactive Javascript website builds the graphical interaction on screen for the mobile device.

In FIG. 4 (a), the user logs into a designated web site using his or her mobile device 10, and then the user's web-enabled display 20 is connected to the same web site, by opening any standard browser and navigating thereto. As the user establishes the connections, in each case, a log-in page is presented that asks for the user's information. Upon log in, a virtual driving range or golf course is presented to the web-enabled display device 20, downloaded from the gaming resource database 117 via the gaming server 110. However, during the initial load of the web page to the display device 10, a light-weight gaming logic engine 120 can also be downloaded in the background. This web-based gaming engine can be programmed as an asynchronous application, using AJAX, for example.

In FIG. 4(b), once logged in on both devices, 10 and 20, the user can enter the driving range or choose to play games; in either case, he or she can invite friends 30 to play. Invited friends, once logged-in on their own devices, can accept the invitations and join the host's game. The cloud-based gaming rules engine 115 manages clusters of players by joining the records for each of the users in a player database to form a temporary table for each game being played. Each player with an account has his or her own set of database records in the user database 116.

In FIG. 4(c), once the game starts, each player selects a golf club from their specific virtual golf bag and swings their own mobile device 10, and, at "impact," each device analyzes the swing and sends a small packet of swing data to the gaming server 110 where these data are updated in the user database 116. The golf swing motion analysis is described in detail in the following sub section. The interactions between a player and the game rules engine 115, can be done using various input devices of the mobile devices 10, such as by key entry, touching a touch screen, and, where available, even voice recognition.

These swing data are then passed to the display device 20, using one of three methods describe in sub section (2) following. In FIG. 4(d), a downloaded display device graphics engine 125 (using an algorithm to calculate or estimate the ball flight) renders the ball flight 25 on the display 20. Similarly, as friends hit their virtual balls, their motion data is sent from their respective mobile devices 10 to the gaming server 110, where these data are updated to the user database 116. In FIG. 4(e), they are then passed to the specific users, and ball flights rendered in each of their specific environments, so that each players also sees the plurality of golf swing gaming motions from each of their friends, from their specific location in the gaming environment.

Users click or touch to advance to the location of their respective ball flight. The downloaded light-weight web-based gaming engine 120 contains the logic for the display device to determine where the users are on the virtual golf course given their golf swing, and to request the appropriate graphics display content from the gaming resource database 117 via the gaming rules engine 115. The process then repeats, except now the players are most likely in different locations on the golf hole. Player locations are updated to the user database 116, and the gaming engine 120 renders each player's respective ball flights in their respective location on the virtual golf course. Additionally, in an embodiment, players are able to communicate with one another, creating a social network of game players. Such communication can be accomplished by the game rules engine 115 having suitable IP voice-over, text chat, text message board applications, for example.

In addition to playing the game, users can also purchase a plurality of virtual goods and services. These include, but are not limited to: golf lessons, upgraded golf clubs, custom bags or golf club covers, magic balls to mess up a friends shot, virtual prizes for winning tournaments etc. As detailed in U.S. application Ser. No. 13/659,774 to Jeffery et al., entitled METHOD TO PROVIDE DYNAMIC CUSTOMIZED SPORTS INSTRUCTION RESPONSIVE TO MOTION OF A MOBILE DEVICE, filed Oct. 24, 2012, the virtual goods can also include customized golf instruction based upon analysis of the users specific golf swing.

A related novel aspect of the present invention is a "virtual caddie" enabled by predictive analytics. Every swing a user takes in the system is captured in the motion archive database 118. For each user shot, these data are mined using analytics software, and predictive models used. So for example, after 100 swings of the driver, if on average the user hits 249 yards but slices 30 yards to the right, on the tee of a particular hole the "virtual caddie" might recommend to play a three wood, in order to miss the water hazard 235 yards distant and 25 yards on the right.

The motion archive database 118 may also be augmented with data captured on a physical golf course, through a user's manual input into their mobile app via touching the screen, or voicing commands after each shot, or by a gyroscope and accelerometer physically attached to a golf club and connected via Bluetooth to the mobile device. The virtual caddie can then be extended to playing physical and virtual golf, so that on a physical golf course similar advice is given to playing in the virtual course.

Additional technical aspects of the disclosed golf game are described in the following sections: (1) Distributed gaming engine, (2) Mobile device swing analysis; and; (3) Display device optimization.

(1) Distributed Gaming Engine

FIG. 5 illustrates an embodiment of the gaming platform 100 for a golf game. As discussed earlier, the gaming analysis is distributed across the three major components of the system: the mobile devices 10, the gaming server 110, and the display devices 20. FIG. 5 provides an example of different modes of play for four different players 30: A, B, C and D. It is understood that this example is illustrative and is not limited to four players. As shown, player A has a mobile device 10 but does not have a display device 20. In this mode, the game graphics are displayed singularly on the mobile device 10 of the player A. The player B is in a different geographic location from the player A and has access to a display device 20. Gaming interaction and graphical display on the display device 20 are described in the following text. Illustratively, players C and D are in the same geographic location, different from users A and B, with a display device 20. Users in the same geographic location may use a singular mobile device, configured to know the identity of respective players using the device, or may have their own respective mobile devices. It is understood that the examples shown in FIG. 5 are not limited to a particular hardware manufacture.

Analysis of the golf swing is conducted on the mobile device 10 via the method described in the following section. The output from this analysis includes, but is not limited to, swing speed of the mobile phone, angle of the phone through impact (hook or slice), forearm rotation rate, wrist hinge rate, and swing path (inside outside or outside in). These data are transmitted to the gaming server 110, which updates the user database 116, manages different user interactions, and serves the gaming content, as needed. A relatively light-weight Javascript/AJAX gaming engine 120 can be downloaded to an HTML5-enabled display device web browser when the user logs in. This gaming engine 120 controls a specific users display environment, given the users respective swing data passed from the golf gaming server 110. The gaming engine 120 has the gaming logic of the golf game and a graphics engine 125 for ball flight simulation and other rendering. As discussed in detail in the following sections, each golf hole is broken into segments corresponding to two-dimensional photographs or videos. The number of photographs for each hole is selected to optimize both the user experience and the bandwidth and latency of the system, as disclosed in the following section. The grid locations for each hole are defined in advance for each hole and are programmed in the Java code of the web browser gaming engine. The graphical content corresponding to each grid location for each hole is stored in the gaming resource database 117.

Ball flight distance and direction is primarily determined by the club head speed, loft of the club, and angle at impact. For different golf clubs, the loft will be different. However, the speed of the club is directly proportional to the speed of the phone in the user's hands through impact. As described in the following section, we have conducted detailed experiments with high-speed video cameras at 1,000 frames per second to verify the accuracy of the speed of the phone and the club head speed for a golf driver. These data were compared to vendor tables of ball flight distances for various clubs and club head speeds. Slicing or fading the ball reduces the yardage, and hooking or drawing the ball increases the yardage for small degrees of draw, but then overall reduces the yardage for a hook of more than a few degrees.

Given the speed of the phone in the users hands, the height of the user, and the length of the club we are able to calculate the club head speed. More specifically, using a table look up for various golf clubs we can calculate club head speeds for specific golf clubs, and map this speed into ball flights for the various loft angles of each club, again via a table look up. The swing path and hook or slice angle are then used as fractional multipliers/dividers to accurately calculate the distance and direction of the shot from the mobile phone sensor swing data.

Figure 6A:
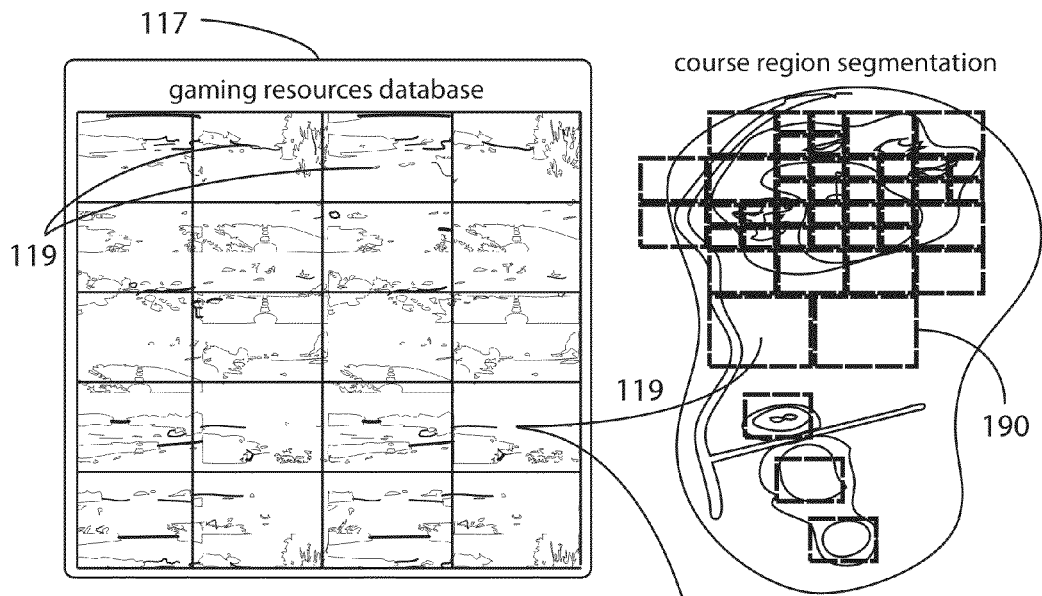
FIGS. 6(a) and (b) illustrate golf hole partitioning into segments corresponding to digital images, according to an embodiment of the present invention.
Figure 6B:
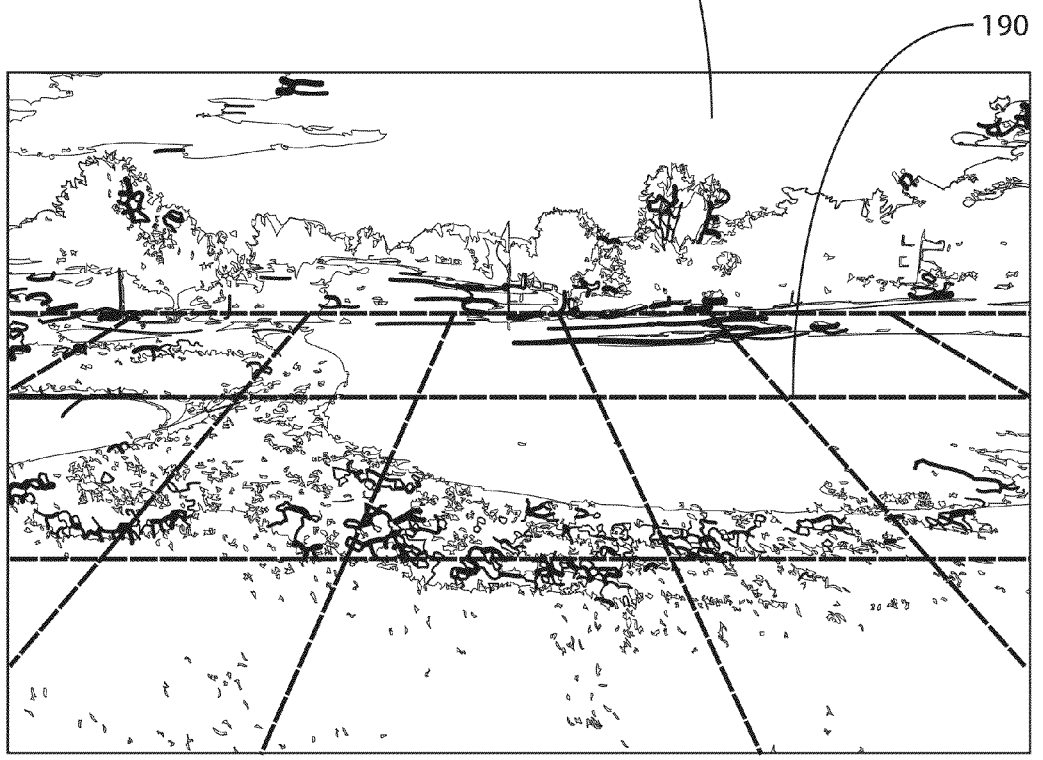

FIGS. 6 (a) and (b) illustrate how each hole is divided into a virtual grid 190. The length of the shot and the direction define an (X, Y) coordinate which is the end-point of the shot. This (X, Y) shot end-point corresponds to a specific grid location, see FIG. 6 (a). For each grid location, media 119 (which can be image, sprite, and/or video) is stored in the gaming resource database 117. Given the (X, Y) coordinates of the shot end point the web page graphics engine queries the resource database 117 and, via a table look up, displays the media 119 corresponding to the (X, Y) location. The user experience is to then view media on the web page of the flag from the perspective of standing at the (X, Y) coordinate location, see FIG. 6(b). As the user swings again, the next (X, Y) coordinate is calculated from the swing speed, club selected and angle of the club head at impact. The graphic engine then displays the appropriate image from the database for the new location.

The swing history for each user is updated to the motion archive database 118. These data are used for analytics of user performance over time, as described previously. The user database 116 is also updated, tracking the progress of multiple players in the game. These data are used as master data to update the gaming engine 120, and enable drawing of other users' avatars and ball flight simulation on a specific users display screen.

Simulated ball flight is rendered in 2-D using a 3-D graphics engine module 125 which is part of the gaming engine 120. For a 1600×900 pixel display resolution the golf ball's flight following a swing is achieved by animating the ball as an individual object on top of the background. The ball begins centered on the page located near the bottom and at a size of 35 pixels wide by 35 pixels tall. Once a swing is detected, its distance and direction is passed into the gaming engine where it is used in determining the exact path of the ball flight. The ball flight is an exponential curve that passes from its starting position to a high position determined by the club used:

+0 pixels for the putter (this creates a straight path resembling a ball rolling)

+200 pixels for the driver

+225 to +325 pixels for the irons

+350 pixels for wedges.

The ball then ends at a Y position in pixels that is equal to: the height of the image's horizon+(the current distance from the flag−the forward distance the ball was hit)/2 and an X position in pixels is equal to: the pixel center of the image+the lateral distance the ball was hit*4.

Throughout the ball flight, the ball is shown "shrinking" at an inverted exponential rate that ends at 3 pixels+170/the yardage of the current swing. The pixel numbers given above are understood to be illustrative and not limiting.

A particularly important feature of the invention is the near real time rendering of ball flight following a mobile device golf swing, with minimal latency. While the game is being played, the website is repeatedly polling the user database 116, looking for an update. When an update is detected, the swing data is taken and passed into the game engine 120, triggering a simulation of ball flight driven by the swing data. How high on screen the ball flies, how far it falls, how far to the left or right it travels, how small the ball becomes, and how long the animation takes, are influenced by this swing data. Ball flights from participants are rendered on each player's respective screen. If a plurality of players are at the virtual driving range, for example, highest yardages are displayed. If players are in a game of golf, each player moves to a new position on the hole determined by their previous swing. In the game, players proceed until they are virtually situated at the putting green, were they simulate putting, and then advance to the next hole once the ball goes into the hole.

The inventors have implemented multiple methods for real time graphical display of ball flight following a swing of a mobile device. The current AJAX solution, "short polling", is very scalable and can be used to update content in real time for large numbers of users.

While the default polling used is once per second, polling more frequently, such as 5- or 6-times per second, is possible. With AJAX polling or "short polling" the issue becomes one of available bandwidth. Even where data is not being transferred, merely checking for an event takes up some bandwidth. So, if there are a large number of users, for example 200,000, polling at 5 times per second requires a considerable amount of bandwidth. However, bandwidth generally scales better than processing power and storage space. Additionally, the polling rate can be dynamically adjusted to manage bandwidth usage.

Referring again to FIG. 3, an architecture incorporating "long polling" is illustrated. The architecture uses WebSocket web technology. The inventors have created a scalable long polling architecture such that there is hardly any lag as the server "pushes" the new data to the website. With AJAX polling we wait for the website to check the database once per half second and there can be a perceptible lag.

Long polling allows for bi-directional transmission of data and one possible technology for long polling is a WebSocket, which is a web protocol providing full duplex communications channels over a single TCP connection. The WebSocket API is being standardized by the W3C, and the WebSocket protocol has been standardized by the IETF as RFC 6455, which is incorporated herein by reference in its entirety.

FIG. 3 illustrates a method via long polling architecture to control and navigate a web display using a mobile device as a controller, and to transmit sports motion data captured by the mobile devices across the network. The phone and web display devices can be in the same or different geographical locations. The communication between the mobile devices and web display devices takes place via the use of web socket technology. FIG. 5 is an embodiment of the architectures of FIG. 2 specifically for golf and can be implemented using the short polling method or the long polling method of FIG. 3.

(2) Mobile Device Golf Swing Analysis

An important aspect of the present invention is the motion analyzer 130 which uses data from an accelerometer and gyroscope embedded within the mobile device 10, following application Ser. No. 13/655,366 to Jeffery et al., entitled METHOD AND SYSTEM TO ANALYZE SPORTS MOTIONS USING MOTION SENSORS OF A MOBILE DEVICE, filed Oct. 18, 2012. A particular challenge that the invention overcomes involves how to accurately analyze a golf swing without actually hitting a ball or holding a club or racquet. While a swing analysis technique is described for golf, it is to be understood that the approach described herein is applicable to other motions such as, but not limited to, hitting or throwing a ball, aiming and shooting a gun, or casting a fishing rod for examples. The last section generalizes the motion analysis method to other sports such as bowling, tennis and baseball.

Figures 7A, 7B:
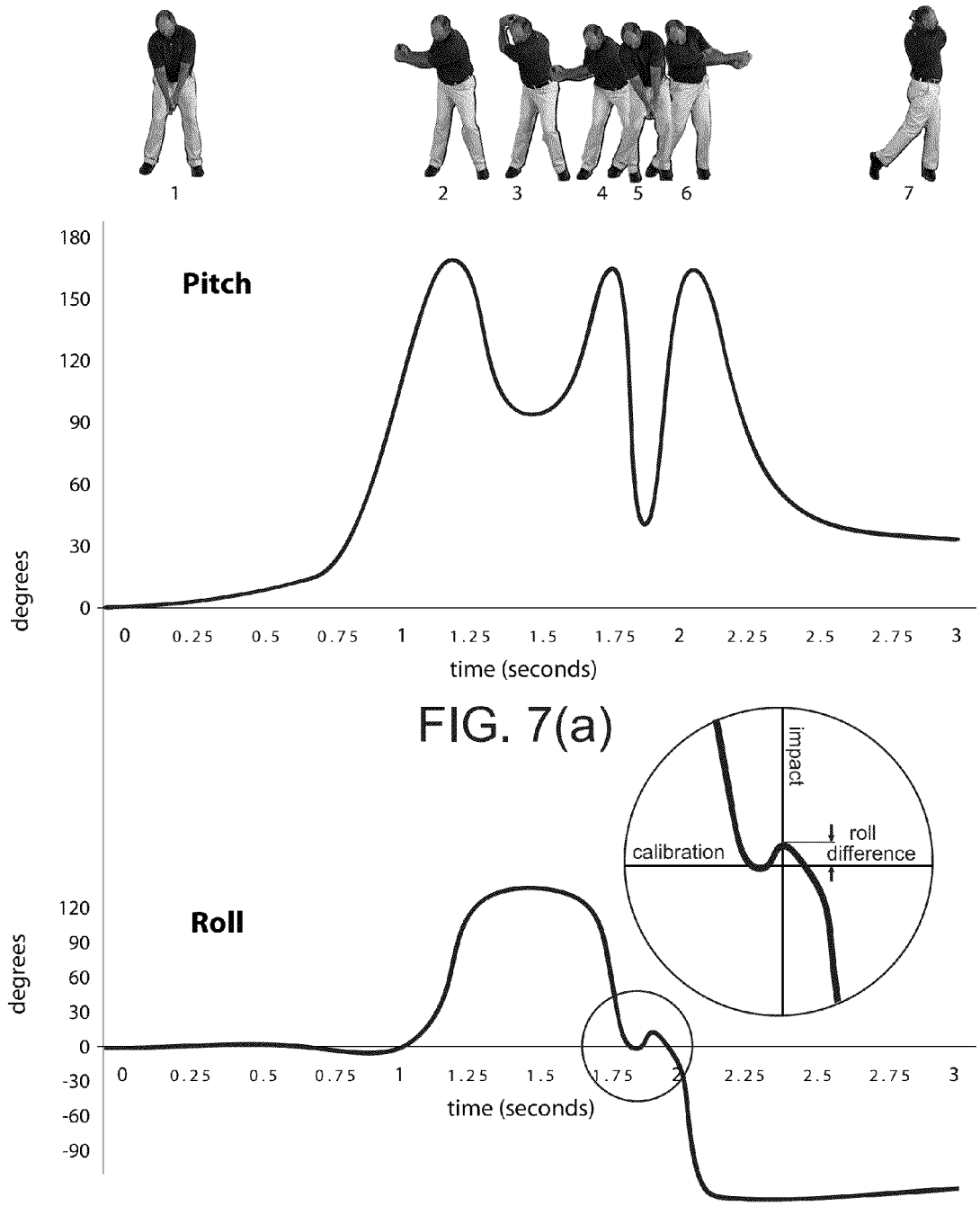
FIGS. 7(a) and (b) illustrate the pitch and roll of the mobile device during an example full golf swing useful for determining swing accuracy.

FIG. 7 illustrates the pitch (a) and roll (b) of the mobile device 10 during an example full golf swing. An important element of the present invention is the calibration of the mobile device 10 by holding the mobile device 10 still in the address position (position 1). The motion signature for the pitch then increases in the backswing (position 2) and has a local minimum at the top of the golf backswing (position 3). However, the minimum (position 3) is an artifact of the pitch motion sensor rotating more than 180 degrees. In actuality, the pitch continues to increase to a maximum, greater than 180 degrees, at the top of the backswing. However, limitations of the sensor constrain the motion signature to 0 to 180 degrees. The pitch data continues to decrease in the downswing (position 4), back to the impact point (position 5), as shown.

Accuracy Analysis

Note that at the impact point (position 5), the mobile device 10 has returned to near the initial calibration point (position 1), which for golf is the hand position at impact with a virtual golf ball and a local minimum. For a high speed golf swing the minimum at the impact point does not return exactly to the calibration zero due to resolution limits of the gyroscope. Determining the impact point is of vital importance because the roll of the mobile device 10 at this point defines the hook or slice of the club. In other sports, the impact point is vital in determining the hook and slice of a bat or a racquet, and/or the release point in throwing or casting sports. From the impact point, the golf swing continues through follow through, positions (6) and (7).

In summary, pitch data, or the rotation around the axis that cuts the mobile device 10 into top and bottom halves when looking at the screen (X-axis) (see FIG. 1) is the most telling data stream as a golfer moves through their swing. Impact can be found at the major minimum that approaches the starting calibration point (which is defined as "zero" by taking the average of all phone position/orientation data over the course of one second, for example, taken prior to the swing when the golfer is in their set-up position). To bring context, in a golfer's swing, pitch data rises as the golfer goes into their backswing, returns to calibration as he or she swing through impact, then rises again as he or she moves into their follow through. Impact is the pitch position that gets closest to the set-up, or calibration point.

In an embodiment, the impact point for a full golf swing is selected to be the second minimum of pitch using a crawler algorithm. In another embodiment, the minimum can be confirmed by aligning it with a spike in Z-acceleration. When more than one major minimum in pitch is found, the minimum selected as impact is determined by which point has the greatest Z-acceleration. This confirmation helps in cases where a golfer's backswing or follow-through rotation is so great (near 360 degree rotation from set-up) that the gyroscope flips completely and creates extra minimums near calibration.

Once impact is found, swing accuracy is determined by subtracting roll data at impact from roll data at calibration. Roll data, or the rotation around the axis that cuts the phone into left and right halves when looking at the screen (Y-axis) describes "open and closed" face positions on the club head. FIG. 7 (b) shows an expanded view of the roll data. Swings that return a negative difference mean that the user over-rotated at impact which implies a closed face at impact and a resulting draw or hook depending on the amount. Swings that return a positive difference mean that the user under-rotated at impact which implies an open face at impact and a resulting fade or slice. Swings that return a near zero value mean the club face very closely matched calibration orientation at impact and imply a straight ball flight.

Speed Analysis

Club head speed is a critical parameter for golf in defining the ball flight distance. The golf club manufacturers have empirical tables which detail the ball flight distance for golf balls hit by club heads moving at a specific swing speeds. Such tables also take into consideration the club type (e.g., driver, 5-iron, putter), the club head loft, the shaft stiffness, and other variables that impact the ball flight.

Swing speed is a complex calculation due to the mechanics of sports motions. The challenge is that the sensors measure motions of the hands whereas we are interested in calculating the speed of virtual sports equipment, such as a golf club head. Extensive experiments with professional athletes were conducted using appropriately fitted sports equipment to understand how hand and arm motions translate to the motion sensor data outputs. While the analysis for golf is illustrated, it is to be appreciated that the present method is generalizable to other sports motions, such as those found in the sports of baseball, tennis, bowling, basketball, American football and table tennis; however, these examples are understood to not be limiting.

Figure 8A:
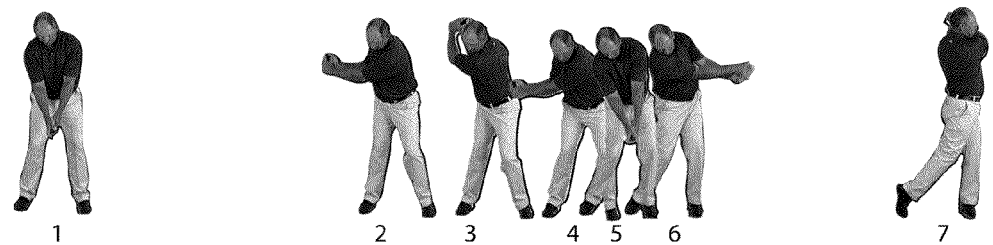
FIGS. 8(a) and (b) illustrate use of pitch data of the mobile device to determine the impact point and the speed of the golf club head through the impact point.
Figure 8A:
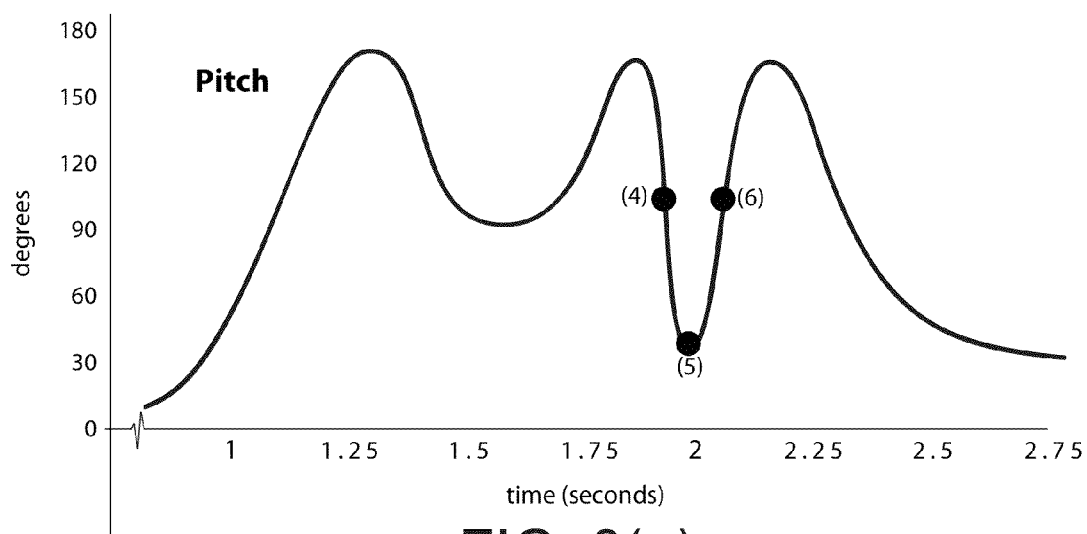
Figure 8B:
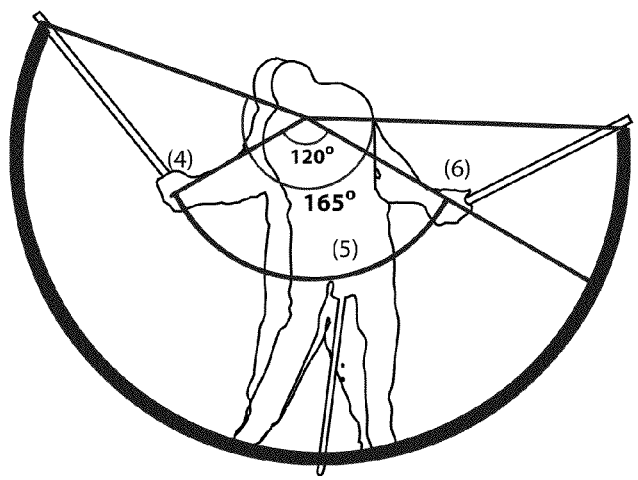

FIG. 8 (b) illustrates the swing motion elements for a full golf swing. If the club is swung exactly in line with the arms, then the mobile device velocity, V, is related to the club head velocity ($V_{club\ head}$) by:

$$V_{club\ head} = V \times (\text{Arm Length} + \text{Club Length})/\text{Arm Length} \quad (2)$$

However, expert players hinge their wrist and rotate their forearms to increase the velocity of the club head through the ball. These hinging and rotating motions can dramatically increase the velocity of the club head through impact, so that Equation (2) is a gross under estimate of the golf swing speed for most golfers. It is a good for putting, however, since there is no hinging of the wrists.

FIG. 8(a) illustrates specifically how we calculate the speed of the mobile device 10 for a golf swing. The motion signature for the pitch of the mobile device 10 for an example full golf swing is graphically illustrated. Shown below is the corresponding sports motion with points (4), (5) and (6) in pitch data labeled on the swing. We first find the impact point in pitch data, defined as the local minimum of pitch at the bottom of the swing (point 5). We then look forward and back in pitch data by 60 degrees. These data points, assuming proper wrist hinging, align with positions in the swing (4) and (6). Generally, about one tenth of a second passes between these two positions, so that given the player's arm length we can find the mobile device speed 10 around impact by dividing the length of a 120 degree arc where the radius of the arc is equal to the arm length by the amount of time passed: This delivers the speed of the mobile device 10 (hand speed). A similar method can be used for chipping but with a shorter arc length of 55 degrees or less due to the reduced swing length.

It has been found, using high speed video clocking, that the driver club head speed can be as slow as 2.4 times hand speed (this is in the case of a user swinging a club with rigid arms, forearms, and wrists) or as fast as 6 times hand speed (in the case of a world class professional golfer). The difference between these two multipliers comes from the combination of forearm rotation and wrist hinge which allow golfers to force the club head to travel through a much greater arc length (sometimes even close to 180 degrees) in the time it takes the hands to travel through the 90 degrees of arc length around impact. The multiplier we choose is driven directly by gyroscope acceleration through impact on the Z and Y axis (yaw and roll) which account for wrist hinge and forearm rotation respectively.

From detailed experiments with the iPhone 4 and 4s it was found that the gyroscope is particularly accurate, so that the roll data is very good to predict hook or slice within approximately half a degree. The accelerometer data from the iPhone 4, however, is "noisy", and is not particularly accurate over the entire golf swing, but does work well for measuring forearm rotation rate around impact. This is why we divide the swing into portions and calculate an average velocity, V, of the mobile device through impact:

$$V = \frac{D_2 - D_1}{t_2 - t_1} \quad (3)$$

where $D_2-D_1$ is the distance between points (4) and (6) in FIG. 8; and $t_2-t_1$ is the time taken to cover the distance. A shorter distance is preferred, since this enables a closer approximation of the instantaneous velocity at the impact point. However the 0.01 sec resolution of the current gyroscope requires us to use the 120 degree arc. In the future, as the sampling resolution of the gyroscope increases, a 30 degree arc or less will be preferred.

Equation (3) is an approximation of the actual instantaneous velocity of the mobile device, and is only a first order approximation of the speed of the golf club head, since it does not include the wrist hinge or forearm rotation described above. Via detailed experiments with a high-speed video camera we were able to find multipliers for these variables, with the result of calculating club head speed within +/−10% for a variety of swing types. From club head speed we can predict ball flight distance in ideal conditions.

We envision that the data quality output from the accelerometer will improve dramatically in future versions of iPhone or Android based phones. In an embodiment of the present invention, the velocity of a mobile device 10 (having a sufficiently accurate accelerometer) at impact is calculated by integrating the acceleration ($a_x$, $a_y$, $a_z$) from the top of the backswing ($t_{bs}$) to the zero ($t_0$) of the mobile device:

$$V_x \int_{t_{bs}}^{t_0} a_x dx$$

$$V_y \int_{t_{bs}}^{t_0} a_y dy$$

$$V_z \int_{t_{bs}}^{t_0} a_z dz \quad (4)$$

with the total mobile device velocity at impact:

$$V = \sqrt{V_x^2 + V_y^2 + V_z^2} \quad (5)$$

where $t_0-t_{bs}$ is the time between the minimal at the top of the back swing ($t_{bs}$) measured from the pitch data and the zero at the bottom of the swing at impact, $t_0$. The integrals are calculating in the software using a fourth order Runge-Kutta algorithm. See for example, William H. Press et al, Numerical Recipes 3rd Edition: The Art of Scientific Computing, 2007.

The velocity component vectors (5) are difficult to accurately calculate with the current version of the accelerometers, since the internal accelerometer has a noisy output, hence why we currently use the average method equation (3). Data on the swing motion is presented to the user and stored, local to the app and on a server in the user's account, for longitudinal comparisons of swing consistency improvement.

The user can also attach the phone to their golf club via a cradle and compare actual practice swings to the computed swings for distance and accuracy. We use a similar analysis when the phone is attached to the club, but the multipliers are different primarily due to users swinging the golf club slower than the phone, the phone is lighter than a golf club so one's hands naturally go faster.

As an additional example of swing analysis we consider putting, rather than the full swing of a golf club. PING, Inc. has previously created an iPhone App for putting. Their prior art invention has three significant limitations however: Their method (1) requires an attachment to a putter, (2) requires impact with a physical ball, and (3) is not accurate for long putts (greater than approximately 20 feet).

The method described herein does not have any of these limitations. Similar to the full swing described above, the user holds the mobile device 10 as if it were a putter, and after one second of being held still it vibrates: the phone is ready. The user then putts an imaginary (virtual) ball. Compared to the full swing, the pitch data from the phone is now a relatively smooth sine wave function with a minimum at impact. The putter stroke is analyzed similar to the full golf swing, but with average velocity calculated from Eq. 3 where $D_1$ and $D_2$ are the respective maximum distances pull back and stroke through impact with the ball. An advantage of the putter stroke is that the function is smooth and the speed is relatively slow compared to the full golf swing. Hence, equations (4) and (5) can also be used to calculate an instantaneous velocity at impact—we use both methods, integration of equations (4) and average velocity from Eq. (3), with a scale multiplier for the length of the putter for speed at the putter head at impact with a ball, see Eq. (2). For long putts the acceleration method becomes increasingly inaccurate, hence the average velocity method provides better results with a multiplier derived from empirical measurements.

From the speed of the putter head the distance the ball travels can be calculated assuming ideal conditions. Most important, however, is that we are able to quantify mobile device roll angle differences at impact (similar to hook or slice for the full swing) without impacting a physical ball. We can also analyze the gyroscope acceleration data for errors such as deceleration through the putt, or a left pull or right push (these last two errors are identified from the combination of the second integral of acceleration, and the roll data). Data on swing motion accuracy is also presented to the user and stored, local to the app and on the server in the user's account, for longitudinal comparisons of putting consistency improvement.

Our method for putting, in conjunction with the distributed gaming platform, overcomes a major deficiency of the golf gaming prior art: putting is notoriously unreliable in a virtual golf game. Expert golfers, who play on the PGA tour, are known to consistently three or four put in golf computer games, where they would one or two put in physical golf. As discussed previously, our method using the mobile device gyroscope is considerably more accurate than a Nintendo Wii controller, for example, so we are able to replicate professional golf putting in the virtual golf game.

Multi-Sensor Impact Detection

A technique for detecting the "impact point" with a virtual object using a single type of rotational data (pitch) of the mobile device 10 was described above. The signature of the sports motion (pitch data as a function of time) was analyzed for characteristics, specific to the type of sports motion (e.g., a full golf swing). The a priori structure of the sports motion signature was necessary to isolate the location in time and space of the virtual impact point. In another embodiment, we extend our inventive concept to enable impact point detection for many different motion signatures, and for a wide range of motions.

FIGS. 8(a) and (b) illustrate changes in pitch and yaw, respectively, of the mobile device 10 during an example full golf swing. In this case, the mobile device used was an Apple iPhone 4Gs. As noted above, calibration of the mobile device 10 is accomplished by holding the mobile device 10 still in the address position (position 1). The motion signature for the pitch then increases in the backswing, (position 2) and has a local minimum at the top of the golf backswing (position 3). However, the minimum (position 3) is an artifact of the pitch motion sensor rotating more than 180 degrees. As noted previously, in actuality, the pitch continues to increase to a maximum, greater than 180 degrees, at the top of the backswing. However, limitations of the sensor constrain the motion signature to 0 to 180 degrees. The pitch data continues to decrease in the downswing (position 4), back to the impact point (position 5), as shown.

From detailed experiments with high speed cameras we found that the virtual impact point (position 5) is a local minimum of pitch, where the mobile device has returned near to the initial address position (position 1). From the impact point (position 5), the golf swing continues through follow through (positions 6 and 7).

Determining the impact point is of vital importance because the roll of the phone at this point defines the hook or slice of the club, bat or racquet, and/or the release point in throwing or casting sports. The inventors have previously used crawler software to search the pitch motion signature for the second minimum. However this method is not universally applicable, since different swings have different motion signatures.

Different types of golf swings can have different motion signatures. Specifically, it was found that for older people playing golf, there is a tendency to abbreviate the back swing, so that the swing signature looks more like a chip, and is missing the first minimum in FIG. 9(a).

Hence, the crawler method which searches for a specific feature of the motion signature of a single motion sensor output produces erroneous results. Specifically, in the case of golf, the motion signature for a professional golfer's full swing has an impact point at the second minimum of pitch data. However, a short swing does not have a second minimum; hence searching for the second minimum in these types of shots will create an error. Accordingly, the method of using motion signature data for single type of rotational measurement to obtain the impact point has limitations. In the present embodiment, we use at least two different types of rotational measurements (pitch and yaw in golf for example) to calculate the impact point and/or release point to overcome this.

Figure 9A:
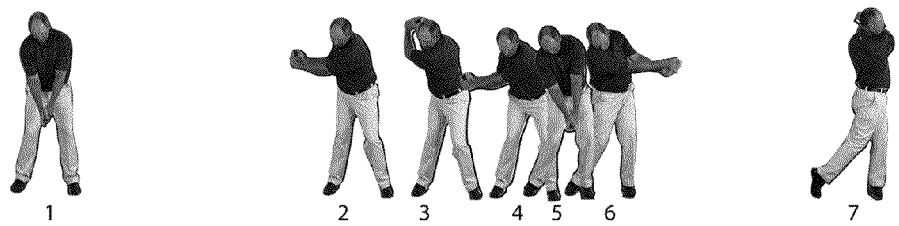
FIGS. 9(a) and (b) illustrate use of pitch and yaw of the mobile device during an example full golf swing to determine the impact point.
Figure 9A:
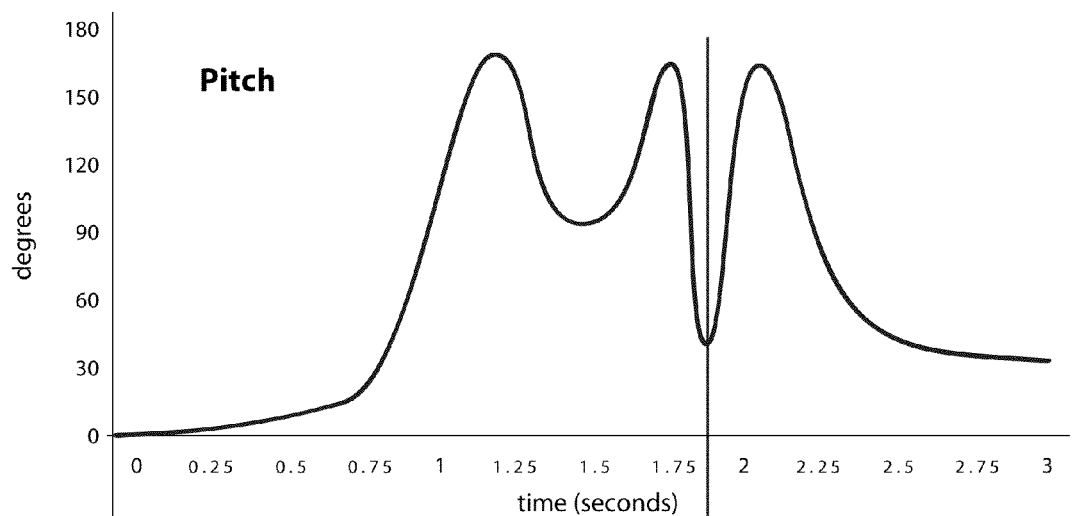
Figure 9B:
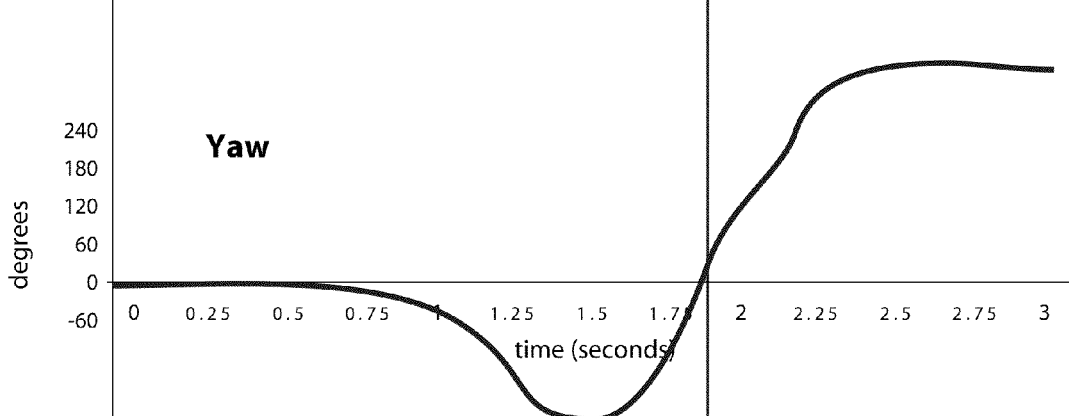

FIG. 9(b) illustrates the yaw of the mobile device through a full golf swing. In the case of golf and baseball swings, the yaw is changing rapidly through the impact point (5). Hence, using both pitch and yaw motion sensor data, one can isolate the impact zone by looking for the minimum of pitch motion data that has a maximum yaw derivative (change in yaw). This method works for all types of golf swings, and enables the accurate impact point detection for chips and putts.

A significant advantage of the multi-sensor impact point detection method is to enable minimization of latency in the motion analysis at the mobile device. Specifically for golf, different users can make very different golf swings, and can randomly delay their swing start after the calibration point. The slowest swings are completed approximately 5 seconds after calibration, while the fastest swings are only 2 seconds. One method is to collect data for 5 seconds after the calibration point in order to capture the vast majority of swings, and then use a crawler to detect the impact point minimum. However, this method is inefficient as it adds a delay of up to 3 seconds, depending upon the speed of the swing, and captures additional data that slows processing on the mobile device.

In our method, the key event is when the yaw equals the yaw at the calibration point, or equivalently crosses zero, see FIG. 9 (b). In the case of a slice the impact point will be several hundredths of a second after the yaw crosses zero, and in the case of a hook the impact point will be several hundredths of a second before the yaw crosses the calibration point. Hence the yaw zero crossing serves as an indicator to locate the impact point at the bottom of the golf swing. Specifically, we look for when the yaw crosses zero and truncate the data after an additional 150 msec: the impact point will be found approximately plus or minus 100 msec from yaw zero crossing.

Assuming a computational processing time of less than 10 msec, the total impact detection and swing analysis time with our method is less than 200 msec. Therefore, for a golf swing the latency of the mobile device motion analysis, $\Delta t_{Swing\ Analysis}$ in Equ. (1), can be reduced from approximately 3 sec to less than 200 msec using our original and inventive multi-sensor impact detection method. Assuming the overall public Internet latency in the continental United States of 50 msec for small data packet transfer, $\Delta t_{Network_{12}}+\Delta t_{Network_{23}}=100$ msec in Equ. (1), the approximate total delay from the impact point on the mobile device to ball flight on the display device is approximately 350 msec, where it is understood the data transfer may encompass thousands of miles out from the mobile device 10 to the gaming server 110 and back to the display device 20. A user takes approximately 500 msec to complete their follow through in a golf swing, motions 5-7 in FIG. 7. Hence the ball flight appears near instantaneously on the display devices 20 to the multiple simultaneous users 30 (A, B, C and D) in the golf gaming system FIG. 5.

It is understood that the method described herein to reduce the mobile device motion analysis latency is not limited to golf swings and is generalizable to other motions. Furthermore the multiple sensors may not be pitch and yaw of the mobile device but can be any two of the plurality of sensor outputs available on the mobile device.

As described in this invention, data on swing motion accuracy is presented to the user and stored in the gaming server 110 in the motion archive database 118, for longitudinal comparisons of swing, putting and chipping consistency improvement. These data are then the foundation for the "Virtual Caddie" analytics disclosed above and for providing customized golf instruction, as disclosed in detailed in U.S. application Ser. No. 13/659,774 to Jeffery et al., entitled METHOD TO PROVIDE DYNAMIC CUSTOMIZED SPORTS INSTRUCTION RESPONSIVE TO MOTION OF A MOBILE DEVICE, filed Oct. 24, 2012.

(3) Display Device Optimization

Yet another advantage of the present invention compared to the prior art is an architecture designed to operate in a distributed Internet environment whereby optimizing display device bandwidth utilization and minimizing overall latency—in the golf context, the time delay between swinging the mobile device and rendering the ball flight on the display device, and rendering the next shot display media. Minimizing latency was discussed in Eq. (1) in the context of passing swing data from the mobile device 10 to the gaming server 110, and then to the graphics engine 120. Here we focus on graphics resolution and method to optimize for a specific user's display device Internet connection speed (bandwidth utilization).

Figure 10:
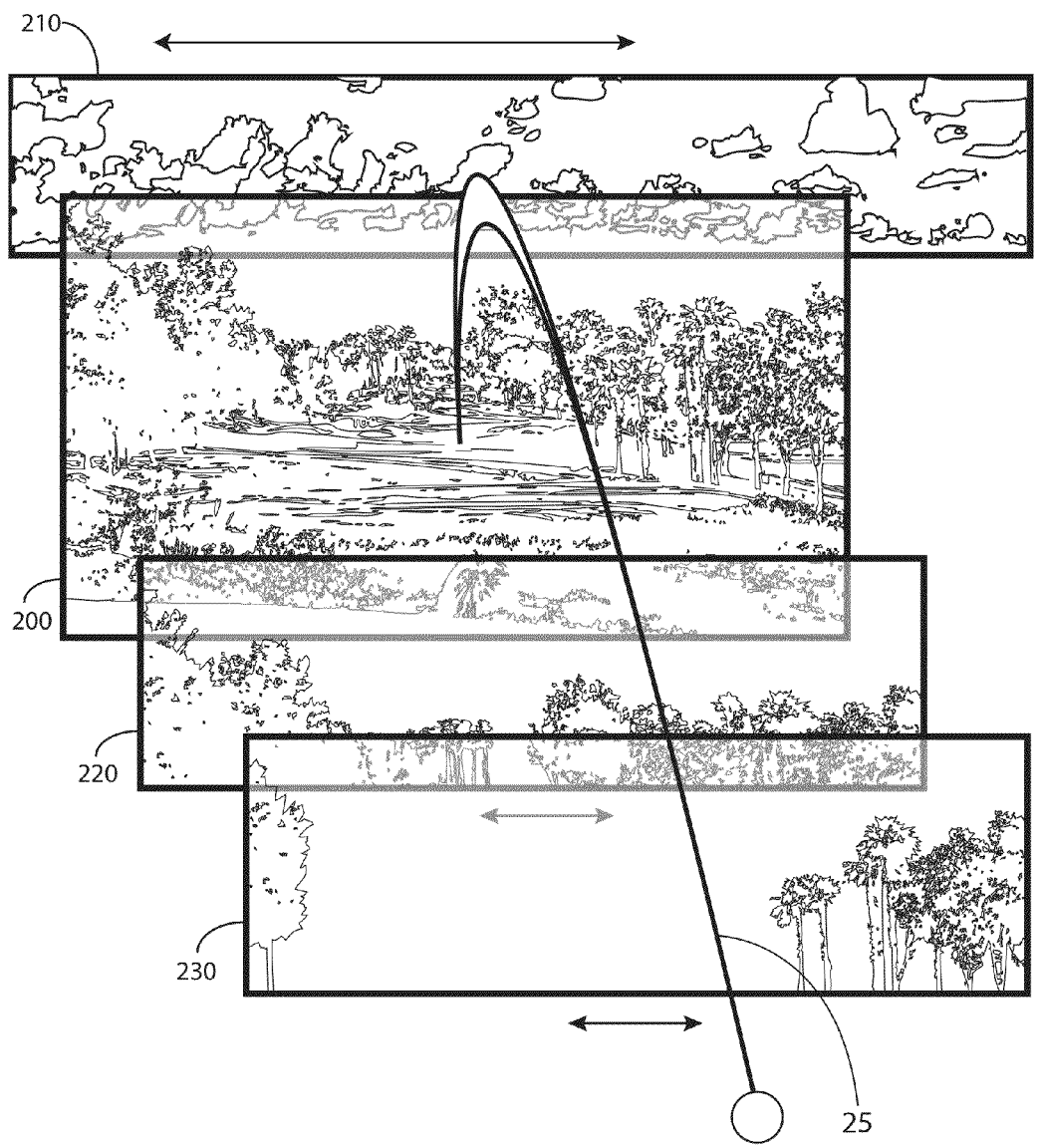
FIG. 10 illustrates the use of layers, cinemagraph, and/or sprite animations to enhance realism of a digital image, according to an embodiment of the present invention.

Rendering a 3-D game such as golf can take considerable computing power, and the graphics quality of prior art console based games is limited by this processing. The present approach is substantially different from console-based games in that the golf holes are each segmented and images are mapped to the segments. In an embodiment, currently available imaging technology such as high dynamic range (HDR) cameras are used. Images can be further enhanced via cinemagraphs (short video clips that cycle) and sprites (short videos that can be controlled by the graphics engine) (as shown in FIG. 10), so that trees, a flag, and clouds appear to move to the wind, for example. Instead of photographs the images can be full screen video, such as compressed high definition video, HDR video, or other imaging technology not yet invented. The effect can be stunning, and has a low data density and computing requirement for each shot. Although the images used can be (or can be based upon) digital images of an actual golf course taken with photographic equipment, it is to be understood that the digital images do not have to correspond to an actual golf course, but could, for example, be entirely an artist's rendition of a golf course or represent a simplification of an actual golf course's terrain.

Cascading style sheets (CSS), supported in web browsers since 2000, enable formatting of graphics and text in a web page. One feature of CSS is to assign a number to the layers of graphics on a page, called the Z-index. The Z-index defines both the number of the layer and the respective order of the layer in the stack of images that comprise a particular web page.

FIG. 10 provides an illustrative example of our technique using CSS to add depth to images in the simulated golf game. This approach minimizes graphics processing at the display device, which reduces latency. A Z-index of 300 is assigned to the background image 200, on top of image are animated clouds 210 and obstructions 220 and 230, which are layers at specific yardages. For example, a tree at 100 yards, 230, and bushes and trees 220 at 150 yards or a are each assigned respective Z-indices of 100 and 150, respectively.

The ball flight 25 initially has a Z index of 300, so that it is displayed on the main background, however depending on the ball flight distance, and hook or slice, the Z-index is changed. Assuming the ball flight is 120 yards with a slice to the right, then the Z-index of the ball flight 25 is changed to 125 so that it falls behind the tree layer 100 and in front of the bush and tree layer 150, for example. Hence, we dynamically change the ball flight Z-index to create the effect of depth in the 2-D image environment so that the ball falls behind layers corresponding to specific distances. This method is not limited to 2-D photographs, but can also be applied to applicable to digital video, HDR video or other imaging technology not yet invented.

We further illustrate the novel aspects of our invention by disclosing a method to reduce the latency and optimize the bandwidth utilization of the display device.

TABLE 1

Comparisons of image densities in prior art methods of digital golf games, where "Aquimo" is the new inventive method.

|  | Images (Par 3) | Images (Par 4) | Images (Par 5) |
| --- | --- | --- | --- |
| Aquimo | 50 | 75 | 100 |
| Method 1 | 100 | 150 | 200 |
| Method 2 | 200 | 300 | 400 |

Table 1 is a comparison of the new inventive method ("Aquimo") to other representative methods, labeled Method 2 and Method 3, respectively. Specifically we use less than 50 images for a par 3, 75 for a par 4, and 100 for a par 5 where other methods use 2× or 4× this amount. Tables 2(a)-2(c) show the representative load times in seconds for 10% of these images for representative bandwidths of 5, 20, and 50 Mb/s, respectively. Available bandwidth increases over time, and our method specifically optimizes on the dimensions of image resolution and pre-load times of images, and is always better than the prior art.

TABLE 2a

Low Bandwidth (5 Mb/sec).

| | 10% Pre-Load | Load Time (sec) @ 5 Mb/sec | | |
| --- | --- | --- | --- | --- |
| | Images Per Shot | Low | Med | High |
| Ai Golf | 5 | 6 | 16 | 40 |
| Method 1 | 10 | 12 | 32 | 80 |
| Method 2 | 20 | 24 | 64 | 60 |

TABLE 2b

| Medium Bandwidth (10 Mb/sec). | | | | |
| --- | --- | --- | --- | --- |
| | 10% Pre-Load | Load Time (sec) @ 10 Mb/sec | | |
| | Images Per Shot | Low | Med | High |
| AI Golf | 5 | 3 | 8 | 20 |
| Method 1 | 10 | 6 | 16 | 40 |
| Method 2 | 20 | 12 | 32 | 80 |

TABLE 2c

| High Bandwidth (50 Mb/sec). | | | | |
| --- | --- | --- | --- | --- |
| | 10% Pre-Load | Load Time (sec) @ 50 Mb/sec | | |
| | Images Per Shot | Low | Med | High |
| AI Golf | 5 | 0.6 | 1.6 | 4 |
| Method 1 | 10 | 1.2 | 3.2 | 8 |
| Method 2 | 20 | 2.4 | 6.4 | 16 |

As an example, we use analytics of past player swing motions to predict future ball flights. So for example, given the average driver distance, hook or slice of the user, and standard deviations of these swing metrics, we can predict the top 5 areas on the course, corresponding to enhanced images, where the ball is likely to land. The more granular methods (Method 2 and 3 in Tables 2a-2c) must load many more images to cover the same areas. Tables 2a-2c shows the comparison assuming a 10% pre load for all methods, and for the three bandwidths with low, medium, and high-resolution images.

Our goal is to provide the best graphical experience to the user as possible while factoring in the bandwidth utilization of the users display device. So for example, a user with a relatively low bandwidth connection of 5 Mb/s will be served lower resolution images, with a 6 sec pre load time for the next 5 images—this is acceptable given the anticipated time the user spends selecting golf club, talking with friends etc. However, if the user has a 50 Mb/s connection, we will serve high-resolution images, with a pre-load time of 4 sec for 5 images.

The bandwidth utilization for a specific display device is measured as follows: A Javascript variable is defined, startLoad, set to the current time as digital image for a game screen (2-D image, cinemagraphs, sprites etc.) totaling approximately 2 MB are transferred from the gaming logic server. A second variable called finishLoad is defined as the image finishes loading: finishLoad−startLoad=time. If time is more than 4 seconds for a single image we reduce the resolution of the digital content, and if the load time is under a second, the gaming digital content resolution is increased.

The user therefore experiences the highest resolution images possible with a reasonable background pre-load time. The effect is an instantaneous transition from shot to shot with the highest resolution images possible matched to the bandwidth utilization of the user. Other methods, illustrated as Method 2 and 3 in Table 2, do not optimize on these dimensions and therefore have prohibitive pre-load download times, causing potentially significant time delays to start the game, in transitions between shots or holes, or less than optimal image resolutions.

Additional Sports Game Examples

The techniques described herein are generalizable to a multitude of games that involve body motion, throwing, or hitting a ball. As further examples, we describe bowling, tennis, and baseball. However, the methods and systems of the present invention are not limited to golf or these other sports, and are applicable to many other sports games, such as motorsports, American football, hockey, rugby, etc. Additionally, it is to be understood that the methods and systems of the present invention may be applicable to other genres besides sports games.

(1) Bowling

The bowling game can be played by two people against each other or opposing teams. Each user (or team) "sees" a main view which is the frame of the bowling alley, a close-up view of impact with the pin, and they can also zoom out and see lanes on either side where friends are playing simultaneously. Each can be photographs, 2-D artist renderings preferably with cinemagraphs for flashing lights on the score board, crowd cheering, etc. or the main image can be full screen video.

An advantage of our method is that the mobile phone motion sensors can be used to more accurately model the bowling swing, compared to prior art such as a Nintendo Wii controller. So that the speed of the throw, the direction of the throw, and the angular rotation, which imparts a spin rate to the bowling ball, can also be measured. For each throw the user first zeros the phone to start with the hand by their side and facing the center of the display device. They feel a vibration, or hear an audio "swing," and then go through a bowling swing motion.

Similar to the golf game, the swing is analyzed on the mobile device 10, and analyzed data are passed to the bowling gaming server 110, which is then passed to the display device 20 using one of the methods described previously. The bowling ball trajectory is drawn dynamically via the downloaded display device graphics engine 125. Sprites are used to model the various pin motions and fall according to the logic programmed into the web based gaming engine 120, which is dependent upon the velocity, trajectory and spin rate of the ball passed for the mobile phone swing analysis. We use the same method of pre-loading content and minimizing latency as in the golf game described previously. Bowling instruction can also be incorporated into the gaming environment, following U.S. application Ser. No. 13/659,774 to Jeffery et al., entitled METHOD TO PROVIDE DYNAMIC CUSTOMIZED SPORTS INSTRUCTION RESPONSIVE TO MOTION OF A MOBILE DEVICE, filed Oct. 24, 2012.

(2) Tennis

Tennis is played between two or four players on a court with a net. We describe the embodiment for two players, but the method is generalizable to four with multiple games played simultaneously by different players. Photographs are taken of various areas of the tennis court from the perspective of the players. We use a minimal set of photographs that are pre-loaded into the environment in order to enable instantaneous display for the user. These 2-D photographs are enhanced with cinemegraphs of the crowd cheering and the clouds moving for example, and by sprites of the ball boy running across the court to grab a ball that hits the net. Alternately, full screen video can be used in place of photographs enhanced by cinemegraphs.

Sprites are created for avatars of the players, mimicking the major shots: serve, forehand, backhand, lob shot etc. These sprites are controlled by the web based tennis gaming engine, downloaded to the display device web page. The ball flight is rendered dynamically by the downloaded graphics display engine, with input data from the mobile phone motion sensors.

The tennis swing is analyzed using motion sensors in the mobile phone in combination with the global positioning sensor. We zero the phone at the beginning of the serve, where the user's hands are up preparing for a serve. We can then analyze the pitch and roll of the phone and the velocity of the phone through impact with the virtual ball—these data define the direction and spin imparted to the virtual ball.

Similarly, backhand, forehand and lob shot motions are analyzed. For these we look for specific rotational motions in the data synchronized with when the virtual ball would come over the net. We also incorporate GPS data to know if the player has shifted to the right or left of the screen, or has stepped forward, towards the net. These data are passed to the tennis gaming engine, so that the player sees the court change dynamically in response to their positions. For example, if the player steps forward on the right side of the screen they see the 2-D image close to the net on the right side of the court.

Minimizing latency is particularly important in tennis, due to the fast pace. There are significant pauses between each shot, so that there are periodic opportunities to re-calibrate the zero of each user's mobile phone. In a preferred embodiment the mobile device 10 is simultaneously connected to the web based gaming server 110 and the display device 20 via a local socket connection 75. This method enables direct back and forth data transfer between the local game components.

Hence the motion analysis is almost instantaneously passed to the local gaming engine 120 to display the ball flight. The ball takes approximately one second to fly across the net with a bounce, and we employ 0.2 sec polling or a WebSocket (FIG. 3) to transmit these mobile phone data to the other player(s) display for graphical rendering. We are able to anticipate ball motion and send 'pre impact detection' data for example, so as to have the avatar make a pre return swing motion, thus synchronizing play with minimal latency.

Additionally, tennis instruction can be incorporated into the gaming environment, following U.S. application Ser. No. 13/659,774 to Jeffery et al., entitled METHOD TO PROVIDE DYNAMIC CUSTOMIZED SPORTS INSTRUCTION RESPONSIVE TO MOTION OF A MOBILE DEVICE, filed Oct. 24, 2012.

(3) Baseball

Baseball is particularly suited to the disclosed method. The gaming resource database 117 can include 2-D photographs or videos taken systematically at various positions on a baseball diamond. Photographs can be enhanced by cinemagraphs for the crowd, clouds moving, etc. Sprites are also used to enhance the images for fireworks and aircraft fly overs, for example.

The game can be single player batting against a virtual team, or two teams of multiple players, for example. For each player/position we create a database 117 of sprites for catching, and throwing. For example, the first base avatar will predominantly catch the ball from multiple directions with a foot on the base, will throw the ball back to the pitcher, and may occasional throw to second, third or home. Hence these sprites can be pre-loaded depending upon the sequence of the game.

The gaming rules engine 115 determines multiple player interactions, interfaces with the gaming resource database 117 and the user databases 116, and the web site gaming engine 120 and graphics engines 125 are downloaded on the specific users display devices 20. Swing and throwing motion analysis is conducted on the users mobile devices 10. So for example, swinging the bat is accomplished by swinging the mobile device. We define a virtual strike zone on the display device, and users swing at virtual balls thrown by the pitcher avatar into this zone. We use the method described in the following section to define the speed of the swing and the swing path. The timing of the swing is used to approximate if the mobile device (bat) missed the ball for a strike, or potentially hit the ball. The gaming rules engine 115 defines a set of swings for corresponding pitches that results in various hits—base hits, fly ball, home run etc. The gaming logic engine 120 then determines the ball flight in response to the mobile device swing, and the sprite player animation responses. The various players may be controlled by virtual teammates—they see the respective 2-D photograph or video of the field and sprite player avatars for their respective locations. We use the motion sensors to analyze a throw of a ball, where a virtual glove on the screen catches the ball.

In a preferred embodiment strikes or hits are determined using the following method. The time $t_{ball\,flight}$, it takes for the virtual pitch to reach the player can be calculated from $t_{ball\,flight}$=d/v where d is the distance from the pitcher to home plate (60.5 feet for major league baseball or 45 feet for little league, as examples) and v is the velocity of the pitch. Assuming a 95 mph pitch in major league baseball, the time of flight of the baseball from the pitcher to home plate is 0.43 seconds. That is, $t_{ball\,flight}$=0.43 seconds. The cloud-based engine compares the time stamp of the thrown pitch, $t_{pitch}$, plus $t_{ball\,flight}$ to the time stamp of the impact point, $t_{impact\,point}$. If they coincide within a predetermined time interval $$\Delta t = |t_{impact\,point} - (t_{pitch} + t_{ball\,flight})| \qquad (6)$$

less than or equal to δ seconds, 0.15 seconds for example, then the virtual bat can be assumed to have hit the virtual ball, and an animation of the ball flight can then be rendered on the Web-enabled display 20 via the cloud-based graphics engine 125. However, if Δt>δ seconds, the virtual bat is assumed to have missed the virtual ball and the swing is deemed a strike.

Preferably, the sports motion analysis and synchronization uses a synchronized mobile device 10, a cloud-based (or otherwise networked) gaming server 120, and a Web-enabled display 20 each with a fidelity of 0.1 seconds or less. Current web browsers have unreliable local clock time stamps and Javascript calls to the internal clock typically do not poll at exactly equal intervals. In a preferred embodiment, the Network Time Protocol (NTP) can be used to synchronize the computer systems over a packet-switched, variable-latency data network. We use the Java Script NTP client to acquire the time offsets of the clients (mobile device 10 and display device 20) and the server (cloud based software engine). This sets the initial coordinated time based upon an accurate external clock. We then schedule a Java Script callback using setInterval( ) at the highest reliable granularity possible, which is web browser dependent. We do not assume that the callback is being called at reliable intervals, however, but instead use the call new Date( ).getTime( ) from within the callback and apply the offset to get the actual coordinated time, and then interpolate to find the actual time of the pitch, $t_{pitch}$, and the virtual impact point, $t_{impact\,point}$. These data are then used to calculate Eq. (6).

Hence our method is generalizable and extensible to the use case where the sports motion is impacting a moving virtual object, such as a baseball or tennis ball, and can be similarly applied to tennis, badminton, table tennis, racquet ball, hockey, basketball, American football, and all other similar sports where the virtual sports object (e.g., ball, puck, shuttlecock) is in motion and then struck, thrown, or caught by the sports motion and the players virtual sports equipment.

Baseball instruction, especially for batting and pitching, can be incorporated into the gaming environment, following U.S. application Ser. No. 13/659,774 to Jeffery et al., entitled METHOD TO PROVIDE DYNAMIC CUSTOMIZED SPORTS INSTRUCTION RESPONSIVE TO MOTION OF A MOBILE DEVICE, filed Oct. 24, 2012

Generalized Sports Motion Analysis

Figures 11A, 11B, 11C:
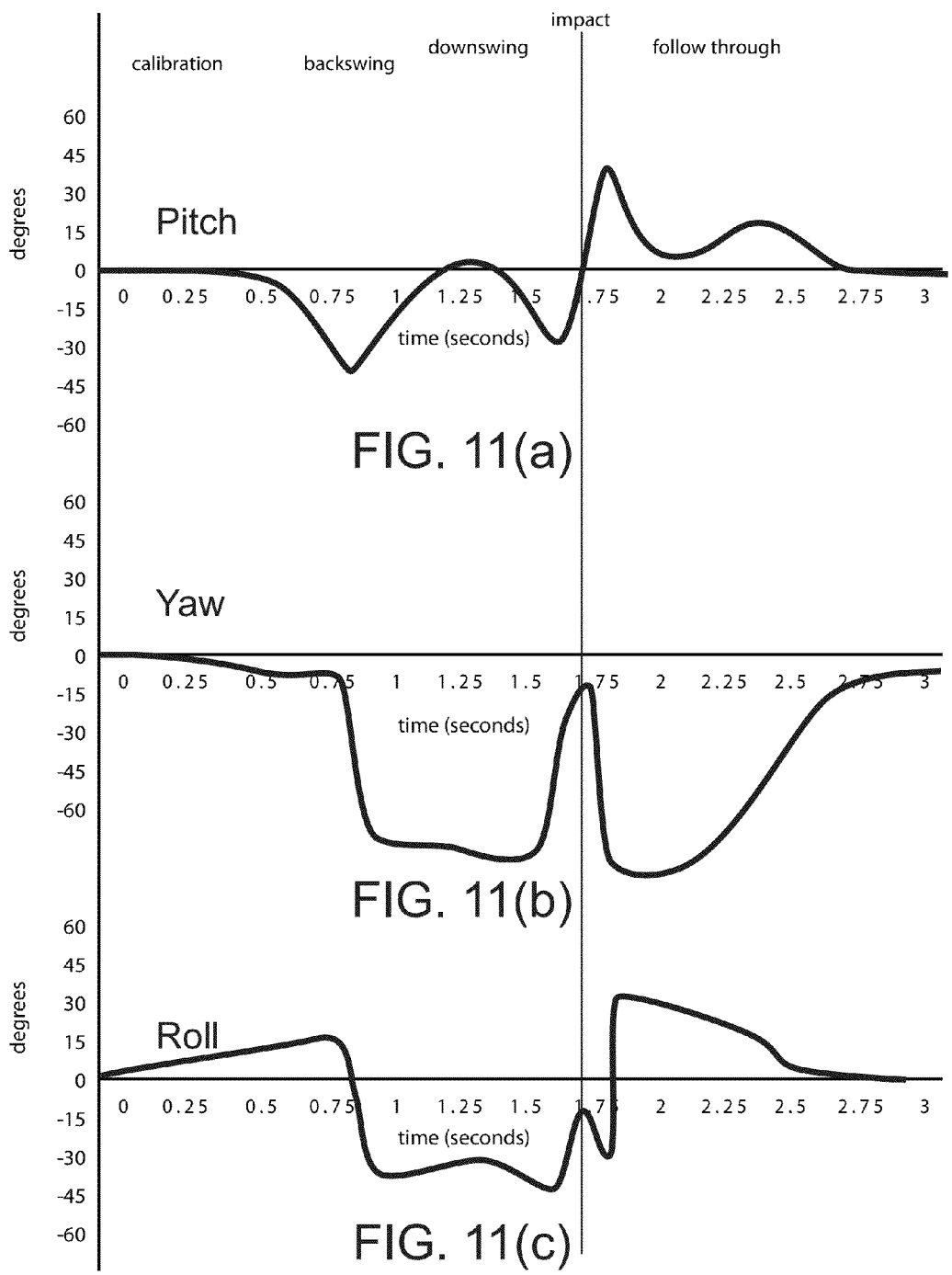
FIGS. 11(a) to (c) illustrate changes in pitch, yaw and roll of the mobile device during an example tennis swing or seated horizontal golf swing.

Our method of using data from multiple motion sensors of the mobile device to analyze a golf swing is generalizable to other types of sports motions. FIGS. 11(a) to (c) shows example motion data of a tennis forehand, or a seated horizontal golf swing. In this example the swing path is in the horizontal plane but with forearm rotation and wrist hinging around impact. Hence, the motion signature is different from a standing golf swing and the impact point in FIG. 11(a) the pitch is now a zero crossing of pitch data. The challenge is to detect the correct zero crossing. In this example, the yaw is a local maximum near the impact point. Hence again using two types of rotational measurements (pitch and yaw), see FIGS. 11 (a) and (b), pitch and yaw, respectively, we can more accurately detect the impact point from data of a single sensor, in this case pitch. In the case of a tennis swing, the roll data at the impact point, see FIG. 11 (c), can be used to calculate the hook or slice spin imparted to the tennis ball.

Note that the calibration point need not be a specific setup position where the mobile device 10 is held still for one second in the same position. For tennis and table tennis the calibration point may be obtained from any point where the player has his or her hands in a ready position to play, and/or may be selected as an end point or calibration point of a prior sports motion.

To illustrate preferred embodiments where the sports motion may intersect with a moving virtual object and the release point and impact point is different from the calibration point, we provide examples for baseball and bowling.

Figures 12A, 12B, 12C:
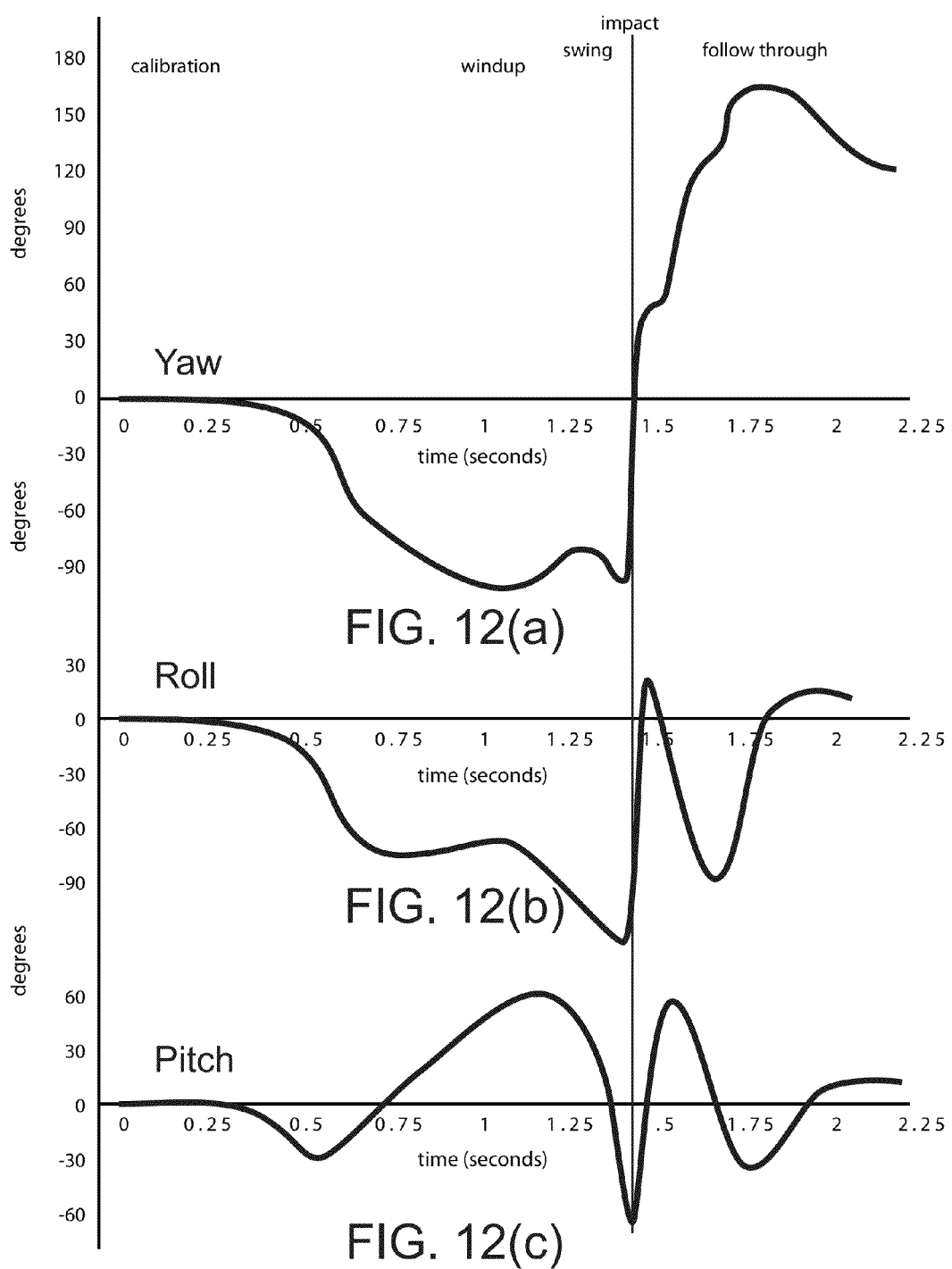
FIGS. 12(a) to (c) illustrate yaw, roll and pitch for a baseball swing.

Baseball swing motion sensor data is illustrated in FIGS. 12(a) to (c). For a baseball swing the calibration point is a set-up position with the mobile device 10 held in both hands out in front of the body, with the thumbs pointing so as to naturally line up the mobile device (virtual bat) with a ball on a virtual tee; the hands are perpendicular to the ground. The data shown is from a professional athlete and illustrates the essential features of an optimal baseball swing motion. For the baseball sports motion, yaw FIG. 12 (a) is the key variable, since as the "bat" is swung through the impact point with a virtual ball, the ideal hand position is with the palms parallel to the ground, which causes a rapid change in yaw of the mobile device through impact. The yaw at the calibration point was zero; hence the impact point is when the yaw crosses zero, see FIG. 13 (a), even though the mobile device is rotated ninety degrees relative to the calibration point. In an ideal baseball swing the roll of the bat occurs just after the impact point see, FIG. 13(b). In the event there is a roll maximum at the impact point, then the wrists have a tendency to lift the bat over the top of the ball, causing a ground or missed ball: this is the "swing bubble."

The pitch and yaw of the mobile device 10 taken together provide insights into the angle of the bat through the impact point. For example, the pitch data in FIG. 12(c) shows that the hands sloped downward at the impact point, since the pitch is negative at the impact point and does not return to zero until after the impact point, and hence the bat would have contacted the virtual ball if it were thrown below the calibration point, that is, in the lower half of the strike zone.

Figure 13A:
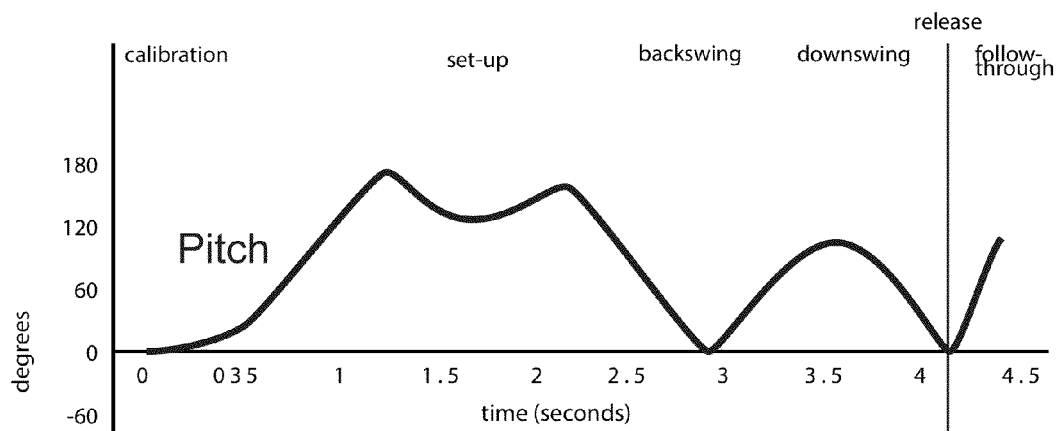
FIGS. 13(a) to (c) illustrate pitch, roll and yaw for a bowling motion.
Figure 13B:
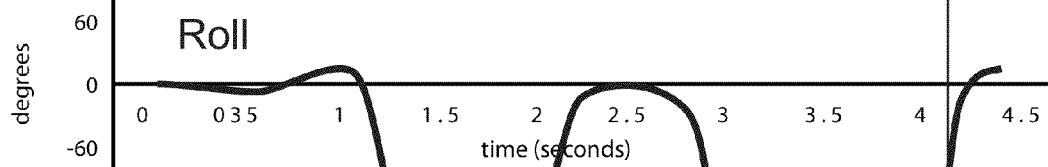
Figure 13C:
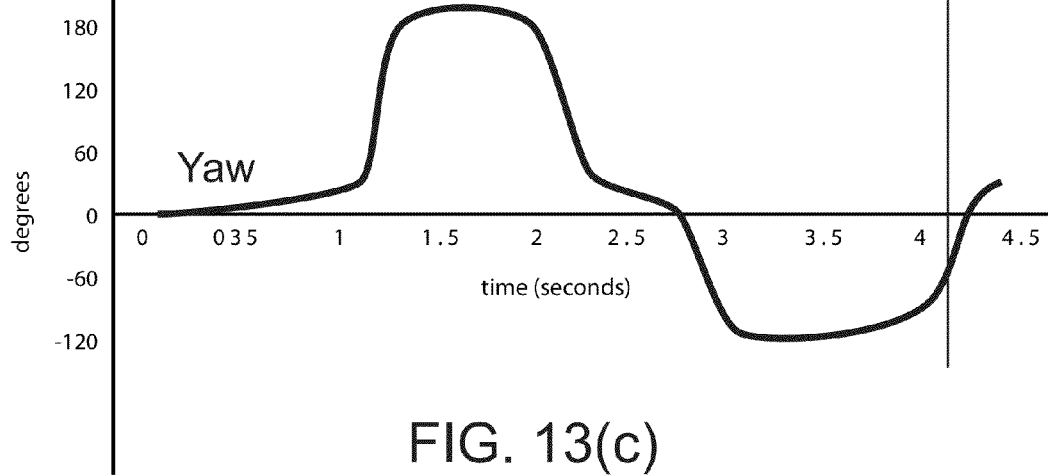

As a last example, we consider the use case where the release point is different from both the calibration point and the impact point. FIGS. 13(a) to (c) illustrate the mobile device motion sensor data for a bowling sports motion. In this example, the calibration point is the hand at rest, relaxed and fully extended at the player's side, with the palm of the hand facing forward. The bowling motion is to first bring the virtual bowling ball up to the chin, cradled in both hands, and then to swing down and forwards while taking a few steps. The pitch data illustrates how the pitch of the mobile device 10 increases as the mobile device 10 is brought up to the chin, where there is a local minimum as the player starts to step forward. Then, the pitch decreases as the player swings down in the backswing motion, where there is a zero of pitch corresponding to the initial calibration zero, and then the motion transitions to the final downswings to a second zero, which is the release point of the virtual bowling ball.

Similar to the golf swing described previously, the velocity of the virtual bowling ball can be calculated from Eq. (3) and the time difference between 30 or 60 degree pitch points, similar to FIG. 8, or via integrating Eq.'s (4). The rate of change of the roll data, the derivative of roll, through the release point is proportional to the spin rate imparted to the virtual bowling ball. Hence we can calculate the velocity and spin of the virtual bowling ball at the release point.

Note in this example the release point is different in space from the calibration point, and the impact point is further removed from the release point. In this example, the impact point occurs in virtual space. As described above, using a cloud-based gaming platform 100 the bowling ball can be displayed on a virtual bowling lane on an HTML5 web-enabled display, such as a web TV, and the impact with the pins simulated in time and space given the velocity and spin of the virtual bowling ball, and the length of the virtual bowling lane. Hence, the player executes the virtual bowling motion, and sees the virtual bowling ball go down the lane and hit the pins on the Web-enabled display, with a path and speed determined by the velocity and spin calculated from the swing signature of the mobile device and synchronized in time to appear like a continuous motion.

While this invention has been described in conjunction with the various exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A gaming system, comprising;
   a gaming server configured to manage at least one game, wherein
   (a) a first connection is established between a first device and the gaming server, the first device having first motion sensors;
   (b) a second connection is established between a second device and the gaming server;
   (c) a third connection is established between a third device and the gaming server, the third device having second motion sensors;
   (d) at the gaming server, via the first connection, first device game motion data is received from the first device, the first device game motion data determined using the first motion sensors, responsive to the first device being moved by a first player during a game;
   (e) at the second device, first image content is displayed related to the game, the first image content rendered at least in part based on the received first device game motion data;
   (f) at the gaming server, via the third connection, third device game motion data is received from the third device, the third device game motion data determined using the second motion sensors, responsive to the third device being moved by a second player during the game; and (g) at the second device related to the game, second image content is displayed, the second image content rendered at least in part based on the received third device game motion data;

wherein the second device includes an asynchronous web application having gaming logic downloaded from the gaming server.

2. The gaming system of claim 1, wherein the second device is a web-enabled display.

3. The gaming system of claim 1, wherein the first connection and the second connection are separate Internet connections.

4. The gaming system of claim 1, wherein the first motion sensors include a gyroscope and an accelerometer.

5. The gaming system of claim 1, wherein the first device analyzes raw motion data obtained from the gyroscope and the accelerometer to determine the first game motion data.

6. The gaming system of claim 1, wherein the first device game motion data includes swing speed and roll angle.

7. The gaming system of claim 6, wherein the first device game motion data includes forearm rotation rate, wrist hinge, and swing path.

8. A method, comprising:
(a) establishing a first connection between a first device and a gaming server, the first device being a smartphone having first motion sensors;
(b) establishing a second connection between a second device and the gaming server;
(c) receiving at the gaming server, via the first connection, first device game motion data from the first device, the first device game motion data determined using the first motion sensors, responsive to the first device being moved by a first player during a game; and
(d) displaying image content at the second device related to the game, the image content rendered at least in part based on the received first game motion data;
(e) establishing a third connection between a third device and the gaming server, the third device having second motion sensors;
(f) receiving at the gaming server, via the third connection, third device game motion data from the third device, the third device game motion data determined using the second motion sensors, responsive to the third device being moved by a second player during the game; and
(g) displaying image content at the second device related to the game, the image content rendered at least in part based on the received third device game motion data.

9. The method of claim 8, wherein the game is a simulated version of golf, and the steps (c) and (d), and (f) and (g), are alternatively performed as the game progresses.

10. The method of claim 8, wherein the image content is rendered at least in part based on the first device game motion data, received by the second device via a local network connection from the first device.

11. The method of claim 8, wherein the second device is a web-enabled display.

12. The method of claim 8, wherein the first connection and the second connection are separate Internet connections.

13. The method of claim 8, wherein the first motion sensors include a gyroscope and an accelerometer.

14. The method of claim 13, wherein the first device analyzes raw motion data obtained from the gyroscope and the accelerometer to determine the first game motion data.

15. The method of claim 14, wherein the first device game motion data includes swing speed and roll angle.

16. The method of claim 14, wherein the first device game motion data includes forearm rotation rate, wrist hinge, and swing path.

17. The method of claim 8, wherein an asynchronous web application is configured to render the image content without direct control of the gaming server and to obtain an indication of the movement by polling the gaming server.

18. The method of claim 17, wherein the polling is long polling.

19. The method of claim 18, wherein the long polling is performed in accordance with the WebSocket protocol.

20. The method of claim 8, further comprising:
(h) establishing a third connection between a third device and the gaming server, the third device having second motion sensors;
(i) establishing a fourth connection between a fourth device and the gaming server;
(j) receiving at the gaming server, via the third connection, third device game motion data from the third device, the third device game motion data determined using the second motion sensors, responsive to the third device being moved by a second player during the game; and
(k) displaying image content at the second and fourth device related to the game, the image content rendered at least in part based on the third device game motion data;
(l) wherein the image content displayed on the second device and the fourth device include substantially the same image content.

21. The method of claim 20, further comprising:
(m) receiving at the gaming server, via the first connection, additional first device motion data from the first device, the additional first device game motion data determined using the first motion sensors, responsive to the first device being again moved by the first player during the game; and
(n) displaying image content at the second and fourth device related to the game, the image content rendered at least in part based on the third game motion data.

22. The method of claim 20, wherein the second device and the fourth device are separate web-enabled displays situated such that the first player and the second player cannot view both at the same time.

23. The method of claim 20, wherein the first device and the third device analyze raw motion data obtained from a gyroscope and an accelerometer on each respective device to determine the first game motion data.

24. The method of claim 20, wherein the first device game motion data includes swing speed and roll angle.

25. The method of claim 20, wherein the first device game motion data includes forearm rotation rate, wrist hinge, and swing path.

26. The method of claim 8, further comprising sending an invitation from the first player to the second player inviting the second player to play the game.

27. The method of claim 8, where the gaming server facilitates communication between the first player and the second player using a voice-over IP protocol.

28. The method of claim 8, wherein the game is one of golf, baseball, bowling, tennis, basketball, table tennis, American football, fishing or hockey.

29. The method of claim 8, wherein rendering the image data includes selecting at least one digital image from a database, the selected at least one digital image corresponding to a location of where a virtual ball is projected to land.

30. The method of claim 29 where the image is a digital photograph.

31. The method of claim 29, wherein the selected at least one digital image includes multiple layers.

32. The method of claim 31, wherein each of the layers is assigned an index value.

33. The method of claim 32, wherein the index value is used to control the vertical stacking order of elements that overlap.

34. The method of claim 32, wherein the index value is a Z-index.

35. The method of claim 8, wherein rendering the image data includes selecting display elements from a content database based upon player interactions and rules of the game.

36. The method of claim 8, wherein image content resolution is adjusted based on bandwidth requirements of the second device.

37. The method of claim 8, wherein rendering the image content includes showing ball flight by mapping a selected digital image into 3-D space and displaying an animation of the ball flight between start and end points of the ball flight.

38. The method of claim 30, wherein the selected digital image is enhanced with one or more of a cinemagraph and a sprite.

39. The method of claim 29, wherein the number of digital images for each golf hole is less than n, where n=50 for a par 3 hole, 75 for a par 4 hole, and 100 for a par 5 hole.

40. The method of claim 29 where the digital image is a video.

41. The method of claim 8, wherein rendering the image content includes pre-selecting a plurality of digital images from a database of digital images, each of the digital images of a portion of a golf course hole, wherein the pre-selecting is based on predicted likelihood of use of the digital photograph; and
   storing the pre-selected digital images in memory of the second device; and
   selecting from the memory a digital image from the pre-selected digital images.

42. The method of claim 8, further comprising:
   (e) establishing an nth connection between an nth device and the gaming server, the nth device having (n−1)th motion sensors;
   (f) establishing an (n+1)th connection between an (n+1)th device and the gaming server;
   (g) receiving at the gaming server, via the nth connection, nth device game motion data from the nth device, the nth device game motion data determined using the (n−1)th motion sensors, responsive to the nth device being moved during the game; and
   (h) displaying image content at the (n−1)th device and the (n+1)th device related to the game, the image content rendered at least in part based on the nth device game motion data
   (i) wherein n is an integer, 3≤n.

43. The method of claim 42, further comprising (j) wherein the image content displayed on the (n−1)th device and the (n+1)th device include substantially the same image content.

44. A method, comprising:
   (a) establishing a first connection between a first device and a gaming server, the first device having first motion sensors;
   (b) establishing a second connection between a second device and the gaming server;
   (c) receiving at the gaming server, via the first connection, first device game motion data from the first device, the first device game motion data determined using the first motion sensors, responsive to the first device being moved by a first player during a game;
   (d) displaying image content at the second device related to the game, the image content rendered at least in part based on the received first game motion data;
   (e) establishing a third connection between a third device and the gaming server, the third device having second motion sensors;
   (f) receiving at the gaming server, via the third connection, third device game motion data from the third device, the third device game motion data determined using the second motion sensors, responsive to the third device being moved by a second player during the game; and
   (g) displaying image content at the second device related to the game, the image content rendered at least in part based on the received third device game motion data;
   wherein the game is a simulated version of golf, and the steps (c) and (d), and (f) and (g), are alternatively performed as the game progresses.

45. A method, comprising:
   (a) downloading, from a gaming server, game logic to a first device, wherein the game logic includes an asynchronous web application;
   (b) establishing a first connection between the first device and the gaming server, the first device having first motion sensors;
   (c) establishing a second connection between a second device and the gaming server;
   (d) receiving at the gaming server, via the first connection, first device game motion data from the first device, the first device game motion data determined using the first motion sensors, responsive to the first device being moved by a first player during a game; and
   (e) displaying image content at the second device related to the game, the image content rendered at least in part based on the received first game motion data.

46. A method, comprising:
   (a) establishing a first connection between a first device and a gaming server, the first device having first motion sensors;
   (b) establishing a second connection between a second device and the gaming server;
   (c) receiving at the gaming server, via the first connection, first device game motion data from the first device, the first device game motion data determined using the first motion sensors, responsive to the first device being moved by a first player during a game;
   (d) displaying image content at the second device related to the game, the image content rendered at least in part based on the received first game motion data;
   (e) establishing a third connection between a third device and the gaming server, the third device having second motion sensors;
   (f) establishing a fourth connection between a fourth device and the gaming server;
   (g) receiving at the gaming server, via the third connection, third device game motion data from the third device, the third device game motion data determined using the second motion sensors, responsive to the third device being moved by a second player during the game; and
   (h) displaying image content at the second and fourth device related to the game, the image content rendered at least in part based on the third device game motion data;
   wherein the image content displayed on the second device and the fourth device include substantially the same image content.

47. A method, comprising:
(a) establishing a first connection between a first device and a gaming server, the first device having first motion sensors;
(b) establishing a second connection between a second device and the gaming server;
(c) receiving at the gaming server, via the first connection, first device game motion data from the first device, the first device game motion data determined using the first motion sensors, responsive to the first device being moved by a first player during a game; and
(d) displaying image content at the second device related to the game, the image content rendered at least in part based on the received first game motion data;
wherein rendering the image data includes selecting at least one digital image from a database, the selected at least one digital image corresponding to a location of where a virtual ball is projected to land, the selected at least one digital image including multiple layers, each of the layers assigned an index value.

48. A method, comprising:
(a) establishing a first connection between a first device and a gaming server, the first device having first motion sensors;
(b) establishing a second connection between a second device and the gaming server;
(c) receiving at the gaming server, via the first connection, first device game motion data from the first device, the first device game motion data determined using the first motion sensors, responsive to the first device being moved by a first player during a game; and
(d) displaying image content at the second device related to the game, the image content rendered at least in part based on the received first game motion data;
wherein rendering the image data includes selecting at least one digital image from a database, the selected at least one digital image corresponding to a location of where a virtual ball is projected to land, the selected image is a digital photograph enhanced with one or more of a cinemagraph and a sprite.

* * * * *